US009755880B2

(12) United States Patent
Cheng et al.

(10) Patent No.: US 9,755,880 B2
(45) Date of Patent: Sep. 5, 2017

(54) SYNCHRONIZATION SEQUENCES AND CARRIER TYPE DETECTION

(71) Applicant: Telefonaktiebolaget L M Ericsson (publ), Stockholm (SE)

(72) Inventors: Jung-Fu Cheng, Fremont, CA (US); Mattias Frenne, Uppsala (SE); Havish Koorapaty, Saratoga, CA (US); Daniel Larsson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 447 days.

(21) Appl. No.: 14/273,640

(22) Filed: May 9, 2014

(65) Prior Publication Data

US 2014/0334478 A1  Nov. 13, 2014

Related U.S. Application Data

(60) Provisional application No. 61/822,235, filed on May 10, 2013.

(51) Int. Cl.
*H04J 3/06* (2006.01)
*H04L 27/26* (2006.01)

(52) U.S. Cl.
CPC ........ *H04L 27/2659* (2013.01); *H04L 27/261* (2013.01)

(58) Field of Classification Search
None
See application file for complete search history.

(56) References Cited

U.S. PATENT DOCUMENTS 8,654,666 B2*  2/2014  Chung ............... H04L 5/001
                                            370/252
2011/0268101 A1* 11/2011  Wang ............... H04L 5/0053
                                            370/344

(Continued)

OTHER PUBLICATIONS

Author Unknown, "3rd Generation Partnership Project; Technical Specification Group Radio Access Network; Evolved Universal Terrestrial Radio Access (E-UTRA); Physical Channels and Modulation (Release 10)," Technical Specification 36.211, Version 10.5.0, Jun. 2012, 3GPP Organizational Partners, 101 pages.

*Primary Examiner* — Kibrom T Hailu
(74) *Attorney, Agent, or Firm* — Withrow & Terranova, PLLC

(57) ABSTRACT

Systems and methods relating to detecting one or more characteristics (e.g., a carrier type or a carrier mode) of a carrier signal transmitted by a radio access node of a cellular communications network are disclosed. In one embodiment, a method of operation of a wireless device includes receiving a carrier signal transmitted by a radio access node and detecting, in the carrier signal, a first physical signal that primarily supports synchronization and cell identification and a second physical signal that supports a functionality other than synchronization and cell identification. A time-domain spacing between the first and second physical signals is a function of a characteristic of the carrier signal. The method further includes determining a characteristic of the carrier signal based on a time-domain spacing between the first and second physical signals detected in the carrier signal.

31 Claims, 18 Drawing Sheets

(56) References Cited

U.S. PATENT DOCUMENTS

| | | | |
|---|---|---|---|
| 2013/0176952 A1* | 7/2013 | Shin | H04L 5/001 370/329 |
| 2013/0235818 A1* | 9/2013 | Yuan | H04L 25/0202 370/329 |
| 2013/0250818 A1* | 9/2013 | Gaal | H04W 56/00 370/277 |
| 2013/0250923 A1* | 9/2013 | Koorapaty | H04L 5/0007 370/336 |
| 2013/0301491 A1* | 11/2013 | Bashar | H04W 76/048 370/280 |
| 2014/0078912 A1* | 3/2014 | Park | H04L 5/0048 370/252 |
| 2015/0016339 A1* | 1/2015 | You | H04J 11/0073 370/328 |
| 2015/0109974 A1* | 4/2015 | Zeng | H04W 56/0015 370/280 |
| 2015/0139093 A1* | 5/2015 | Seo | H04L 5/0053 370/329 |

\* cited by examiner

SYNCHRONIZATION SEQUENCES AND CARRIER TYPE DETECTION

RELATED APPLICATIONS

This application claims the benefit of provisional patent application Ser. No. 61/822,235, filed May 10, 2013, the disclosure of which is hereby incorporated herein by reference in its entirety.

FIELD OF THE DISCLOSURE

The present disclosure relates to a cellular communications network and, in particular, to carrier type detection in a cellular communications network.

BACKGROUND

Wireless communication systems generally include a cellular communications network and wireless devices (which may be referred to as user terminals or User Equipment devices (UEs)). The cellular communications network generally includes a Radio Access Network (RAN) including many base stations providing radio, or wireless, communications in corresponding coverage areas or cells. Wireless communications systems need means for the wireless devices to find transmissions of the base stations in the RAN of the cellular communications network. This is typically referred to as initial synchronization and is necessary when, e.g., a wireless device is powered on, loses a connection to the cellular communications network during a session, or when Radio Resource Management (RRM) measurements need to be made on neighboring cells.

In Third Generation Partnership Project (3GPP) Long Term Evolution (LTE) cellular communications networks, signals referred to as a Primary Synchronization Signal (PSS) and a Secondary Synchronization Signal (SSS) are used for initial synchronization. The PSS and the SSS allow a coarse synchronization to a carrier transmitted by a base station for a particular cell. The PSS and the SSS are also used as a cell identification mechanism where 504 possible PSS/SSS sequences are spread across different cells. After coarse synchronization, the wireless device fine tunes its synchronization to the carrier using, in LTE, a cell-specific Common Reference Signal (CRS) transmitted in the carrier. Once the wireless device is synchronized to the carrier, the wireless device must then receive critical system information transmitted on the carrier by the base station such as, for example, a bandwidth of the carrier and other system parameters. For LTE, the system information is sent on a Physical Broadcast Channel (PBCH) with additional system information sent in System Information Blocks (SIBs) that are sent on a regular shared data channel used for packet data transmissions (i.e., Physical Downlink Shared Channel (PDSCH)).

In LTE, the PSS and the SSS are structured differently for Frequency Division Duplexed (FDD) and Time Division Duplexed (TDD) carriers. The PSS and the SSS are the same for FDD and TTD carriers, but the spacing between the PSS and the SSS for the FDD carrier is different than that of a TDD carrier. This allows early detection of the duplexing method used on a detected carrier. However, using different spacing between the PSS and the SSS for different carrier types increases initial search complexity.

Another issue with the conventional initial synchronization arises in the context of a heterogeneous deployment of a cellular communications network (i.e., a heterogeneous cellular communications network). Typically, as in the case in LTE, the synchronization signals used for initial synchronization are placed in a single location in the radio frame for a given duplexing mode. Therefore, detection of the synchronization signals allows the wireless device to determine the frame boundary of the radio frame on the carrier. This works well in a homogeneous cellular communications network where most of the base stations are transmitting with similar power. However, in synchronized heterogeneous cellular communications networks, the base stations (or radio access nodes) are transmitting at different power. As such, synchronization signals transmitted by higher power macro base stations can interfere with synchronization signals transmitted by lower power base stations (e.g., pico base stations).

Further, it is often desirable in a heterogeneous cellular communications network to have a wireless device connect to a low-power base station (e.g., a pico base station) even though downlink signals from the macro base station may be received with greater power. This is referred to as operating with a high Cell Selection Offset (CSO). Operating with a high CSO is typically done for two reasons. First, operating with a high CSO allows the load in a highly loaded network to be shifted from macro base stations with higher loading to low-power base stations, which typically have lower loads due to their small coverage regions. Second, operating with a high CSO allows uplink transmissions from wireless devices to be received at the low-power base stations when the received power at the low-power base stations is typically greater than that at the macro base stations.

When the wireless device connects to a low-power base station in spite of greater received power from a macro base station, the interference at the wireless device created by synchronization signals transmitted by the macro base station can be further exacerbated. For example, if the synchronization signals transmitted by the macro base station are received at a power of 8 decibels (dB) greater than the synchronization signals from the low-power base station, then the Signal-to-Interference Ratio (SIR) on the synchronization signals of the low-power base station would be −8 dB. Since the synchronization signals are static, this results in constant interference that can create problems for the wireless device when synchronizing to the low-power base station.

Another problem that occurs in wireless communication systems is carrier type detection. As described above, FDD and TDD carriers are differentiated in LTE by using different spacing between the PSS and the SSS. In future releases of LTE, a new carrier type may be defined for which legacy PSS/SSS sequences are to be used. If another set of spacings is used for the FDD and TDD modes of the new carrier type, this would result in increased complexity for the wireless device during initial search for PSS and SSS, which could already be a complex task. Thus, the same spacing between PSS and SSS is desirable from the point of view of wireless device complexity. However, if the same spacing is used between PSS and SSS for different carrier types/modes, detection of the carrier type/mode then becomes a problem.

There is a need for systems and methods that address the problems discussed above.

SUMMARY

Systems and methods relating to detecting one or more characteristics (e.g., a carrier type or a carrier mode) of a carrier signal transmitted by a radio access node of a cellular communications network are disclosed. In one embodiment, a method of operation of a wireless device is provided. In one embodiment, the method of operation of the wireless device includes receiving a carrier signal transmitted by a radio access node of a cellular communications network and detecting, in the carrier signal, a first physical signal that primarily supports synchronization and cell identification and a second physical signal that supports a functionality other than synchronization and cell identification. A time-domain spacing between the first physical signal and the second physical signal is a function of a characteristic of the carrier signal. The method further includes determining a characteristic of the carrier signal based on a time-domain spacing between the first physical signal and the second physical signal detected in the carrier signal. In one embodiment, the characteristic of the carrier signal is a carrier type of the carrier signal. In another embodiment, the characteristic of the carrier signal is a carrier mode of operation of the carrier signal.

In one embodiment, the first physical signal is a first synchronization signal, which is either a Primary Synchronization Signal (PSS) or a Secondary Synchronization Signal (SSS), and the second physical signal is a reference signal. Further, in one embodiment, the method further includes detecting a second synchronization signal, wherein the first synchronization signal is one of the PSS and the SSS and the second synchronization signal is the other one of the PSS and the SSS. Further, in one embodiment, a time-domain spacing between the PSS and the SSS is a function of the characteristic of the carrier signal, and determining the characteristic of the carrier signal includes determining the characteristic of the carrier signal based on the time-domain spacing between the PSS and the SSS and the time-domain spacing between the reference signal and the first synchronization signal.

In one embodiment, the reference signal is a cell-specific reference signal. Further, in one embodiment, the time-domain spacing between the reference signal and the first synchronization signal is a time-domain spacing between a first symbol of the cell-specific reference signal in a subframe of the carrier signal and one of a group consisting of: the PSS and the SSS.

In one embodiment, the second physical signal is a reference signal, and detecting the first physical signal and the second physical signal includes searching for the reference signal using a predefined value for the time-domain spacing between the reference signal and the first synchronization signal for a corresponding cell of the cellular communications network. In another embodiment, the second physical signal is a reference signal, and detecting the first physical signal and the second physical signal includes searching for the reference signal using a predefined value for the time-domain spacing between the reference signal and the first synchronization signal for a sequence used for at least one of the PSS and the SSS. In yet another embodiment, the second physical signal is a reference signal, and detecting the first physical signal and the second physical signal includes searching for the reference signal using one or more predefined values for the time-domain spacing between the reference signal and the first synchronization signal.

In one embodiment, a wireless device for operation in a cellular communications network is provided. In one embodiment, the wireless device includes a transceiver, a processor associated with the transceiver, and memory containing software instructions executable by the processor whereby the wireless device is operative to receive, via the transceiver, a carrier signal transmitted by a radio access node of the cellular communications network and detect, in the carrier signal, a first physical signal that primarily supports synchronization and cell identification and a second physical signal that supports a functionality other than synchronization and cell identification. A time-domain spacing between the first physical signal and the second physical signal is a function of a characteristic of the carrier signal. Still further, by the processor executing the software instructions, the wireless device is further operative to determine the characteristic of the carrier signal based on the time-domain spacing between the first physical signal and the second physical signal detected in the carrier signal. In one embodiment, the characteristic of the carrier signal is a carrier type of the carrier signal. In another embodiment, the characteristic of the carrier signal is a carrier mode of operation of the carrier signal.

In one embodiment, a radio access node in a cellular communications network is provided. In one embodiment, the radio access node includes a transceiver, a processor associated with the transceiver, and memory containing software instructions executable by the processor whereby the radio access node is operative to transmit a carrier signal including a first physical signal that primarily supports synchronization and cell identification and a second physical signal that supports a functionality other than synchronization and cell identification such that a time-domain spacing between the first physical signal and the second physical signal is a function of a characteristic of the carrier signal. In one embodiment, the characteristic of the carrier signal is a carrier type of the carrier signal. In another embodiment, the characteristic of the carrier signal is a carrier mode of operation of the carrier signal.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods relating to detecting one or more characteristics (e.g., carrier type) of a carrier signal transmitted by a radio access node of a cellular communications network are disclosed. In some embodiments, the cellular communications network is a Third Generation Partnership Project (3GPP) Long Term Evolution (LTE) cellular communications network and, as such, LTE terminology is sometimes used herein. However, the concepts disclosed herein are not limited to LTE and can be used in any suitable type of cellular communications network.

Figure 1:
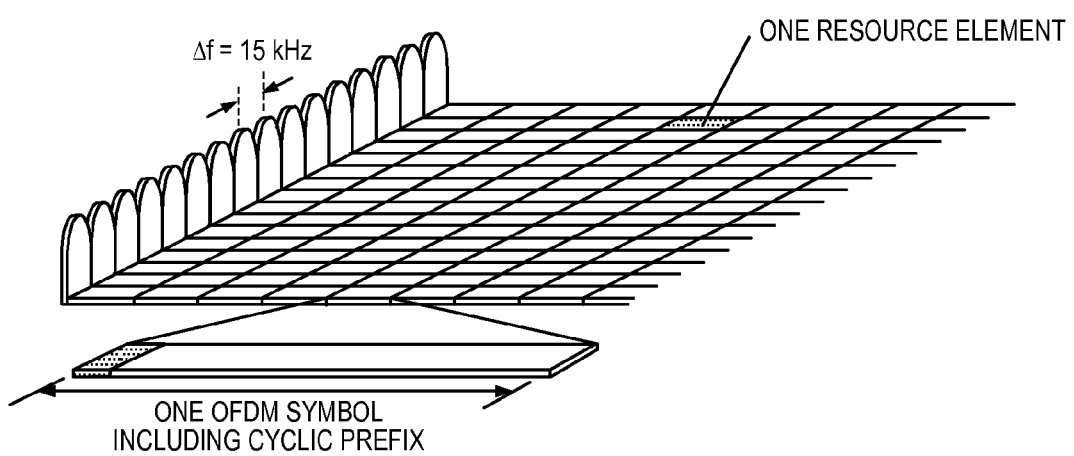
FIG. 1 illustrates the physical Long Term Evolution (LTE) time-frequency resource.

Before specifically describing embodiments of the present disclosure, a brief discussion of LTE may be beneficial. LTE is a mobile broadband wireless communication technology in which transmissions from base stations (which in LTE are referred to as evolved Node Bs (eNBs)) to wireless devices (referred to as User Equipment devices (UEs)) are sent using Orthogonal Frequency Division Multiplexing (OFDM). OFDM splits a carrier signal into multiple parallel subcarriers in frequency. The basic unit of transmission in LTE is a Resource Block (RB), which in its most common configuration consists of 12 subcarriers and 7 OFDM symbols (one slot). A unit of 1 subcarrier and 1 OFDM symbol is referred to as a Resource Element (RE), as illustrated in FIG. 1. Thus, an RB consists of 84 REs.

Figure 2:
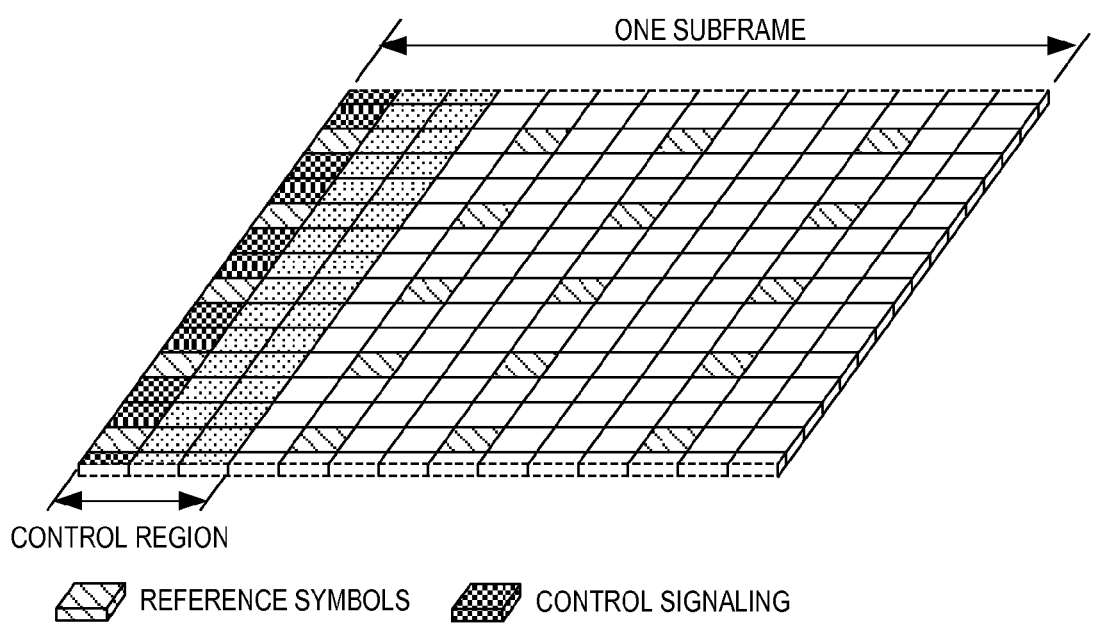
FIG. 2 illustrates a LTE Resource Block (RB)

An LTE radio subframe is composed of multiple RBs in the frequency domain with the number of RBs determining the bandwidth of the carrier signal (i.e., the system bandwidth) and two slots in the time domain, as illustrated in FIG. 2. Furthermore, the two RBs in a subframe that are adjacent in time are denoted as an RB pair. Currently, LTE supports standard bandwidth sizes of 6, 15, 25, 50, 75, and 100 RB pairs. In the time domain, LTE downlink transmissions are organized into radio frames of 10 milliseconds (ms). Each radio frame consists of ten equally-sized subframes of length $T_{subframe}=1$ ms.

A signal transmitted by the base station in a downlink (i.e., the link carrying transmissions from the base station to the wireless device) subframe may be transmitted from multiple antennas and the signal may be received at a wireless device that has multiple antennas. The radio channel between the base station and the wireless device over which the signal is transmitted distorts the signal transmitted from the multiple antennas. In order to demodulate the signal transmitted in the downlink, the wireless device relies on Reference Symbols (RSs) that are also transmitted in the downlink. These RSs and their position in the time-frequency grid are known to the wireless device and hence can be used to determine channel estimates for the radio channel by measuring the effect of the radio channel on these symbols. In Release 11 and prior releases of LTE, there are multiple types of RSs. A Common Reference Signal (CRS) are used for channel estimation during demodulation of control and data messages in addition to fine synchronization as described above. The CRS occurs once every subframe.

Messages transmitted in the downlink can be broadly classified as control messages or data messages. Control messages are used to facilitate the proper operation of the cellular communications system as well as proper operation of each wireless device within the cellular communications system. Control messages could include commands to control functions such as the transmitted power from a wireless device, signaling of RBs within which the data is to be received by the wireless device or transmitted from the wireless device, etc. Examples of control messages are messages transmitted on the Physical Downlink Control Channel (PDCCH), the Physical Hybrid Automatic Repeat Request (HARQ) Indictor Channel (PHICH), and the Physical Broadcast Channel (PBCH). The PDCCH carries, for example, scheduling information and power control messages. The PHICH carries either an Acknowledgements (ACK) or a Negative Acknowledgement (NACK) in response to a previous uplink transmission. The PBCH carries system information. The PBCH is not scheduled by a PDCCH transmission but has a fixed location relative to the Primary Synchronization Signal (PSS)/Secondary Synchronization Signal (SSS). Therefore, the wireless device can receive the system information transmitted in a Broadcast Channel (BCH), which is a carried by the PBCH, before the wireless device is able to read the PDCCH.

Figure 3:
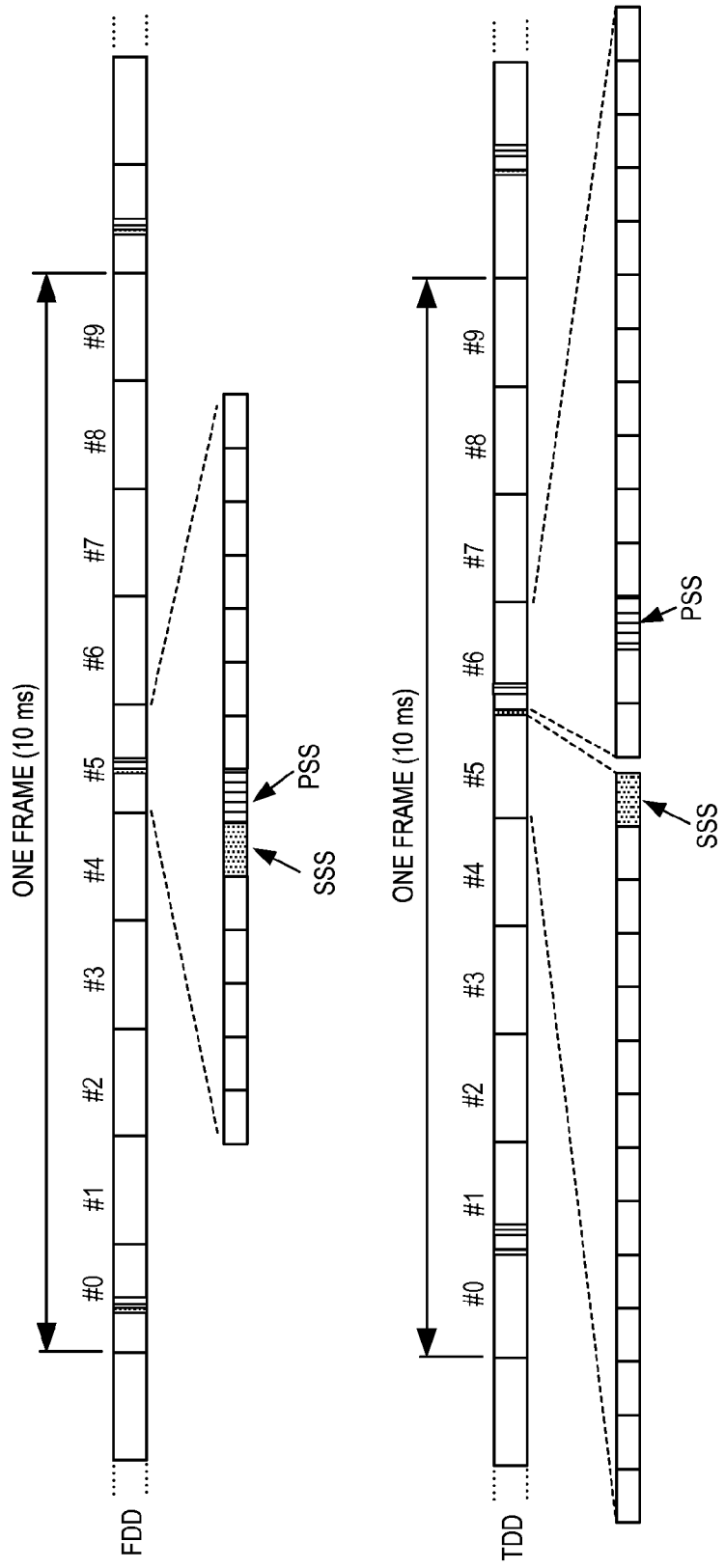
FIG. 3 illustrates the LTE radio frame structure including locations of a Primary Synchronization Signal (PSS) and a Secondary Synchronization Signal (SSS)

A PSS and a SSS are also transmitted in the downlink and utilized for the purpose of initial synchronization. The PSS and the SSS can be seen as control signals with fixed locations and periodicity in time and frequency so wireless devices that initially access the network can find them and synchronize. Specifically, as illustrated in FIG. 3, the PSS and the SSS are transmitted in fixed locations within the radio frame. In particular, for a Frequency Division Duplexing (FDD) carrier, the PSS is transmitted within the last symbol of the first slot of subframes 0 and 5, and the SSS is transmitted within the second to last symbol of the same slot (i.e., just prior to the PSS). Conversely, for a Time Division Duplexing (TDD) carrier, the PSS is transmitted within the third symbol of subframes 1 and 6 (i.e., within the Downlink Part of the Special Subframe (DwPTS)), and the SSS is transmitted in the last symbol of subframes 0 to 5 (i.e., three symbols ahead of the PSS).

The procedure followed by the wireless device to initially acquire a carrier is as follows. The wireless device first performs a cell search operation in which the wireless device searches for known PSS/SSS sequences. Once a valid PSS/SSS is found, the wireless device is coarsely synchronized to a corresponding cell, a cell Identifier (ID) of the cell is known from the detected PSS/SSS sequence, and a carrier type (i.e., FDD or TDD) of the carrier is known from a spacing between the PSS and the SSS. The wireless device then proceeds to read a Master Information Block (MIB) transmitted within the PBCH. The MIB includes necessary system information. Both the PSS/SSS and the PBCH span only 6 RBs regardless of the actual system bandwidth of the carrier. When the wireless device reads the MIB, the wireless device receives information on the system bandwidth configured for the corresponding carrier. Further, control messages can then be read using the PDCCH, which is transmitted over the entire system bandwidth.

In LTE Release 10, all control messages to wireless devices are demodulated using CRS. As such, the control messages have a cell-wide coverage to reach all wireless devices in the cell without having knowledge about the positions of the wireless devices. An exception is the PSS and the SSS which are stand-alone and do not need reception of CRS before demodulation. The first one to four OFDM symbols, depending on the configuration, in a subframe are reserved to contain such control information (see, e.g., FIG. 2). Control messages could be categorized into those types of control messages that need to be sent only to one wireless device (which may be referred to as UE-specific control messages) and those that need to be sent to all wireless devices or some subset of wireless devices numbering more than one (which may be referred to as common control messages) within the cell being covered by the base station.

Figure 4:
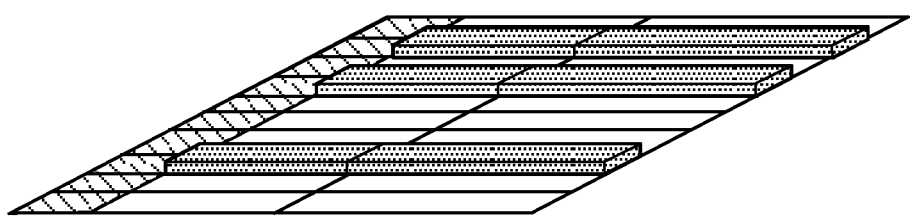
FIG. 4 illustrates one example of an LTE enhanced Physical Downlink Control Channel (ePDCCH)

In LTE Release 11, it has been agreed to introduce UE-specific transmission for control information in form of enhanced control channels. In the enhanced control channels, UE-specific control messages are transmitted using UE-specific reference signals and are placed in the data region. The enhanced control channels are commonly known as enhanced Physical Downlink Control Channel (ePDCCH), enhanced PHICH (ePHICH), etc. FIG. 4 illustrates one example of the ePDCCH. As illustrated, in this example, the ePDCCH includes three ePDCCH regions of size 1 Physical Resource Block (PRB) pair each within the data region of a downlink subframe. The remaining RB pairs can be used for Physical Downlink Shared Channel (PDSCH) transmissions. For the enhanced control channels in LTE Release 11, it has been agreed to use antenna port p∈{107,108,109,110} for demodulation, i.e. the same antenna ports that are used for the PDSCH transmission using Demodulation Reference Signal (DM-RS) symbols. This enhancement means that precoding gains can also be achieved for the enhanced control channels. Another benefit is that different PRB pairs (or enhanced control regions) can be allocated to different cells or different transmission points within a cell, which thereby enables inter-cell or inter-point interference coordination between control channels to be achieved. This is especially useful for a heterogeneous cellular communications network.

A new carrier type may be developed for future LTE releases. One of the main design tenets of a new carrier may be the minimization of mandatory transmissions resulting in reduced overhead as compared to prior LTE releases. In order to achieve this, the CRS symbols may be replaced with reference symbols, which may be referred to as enhanced Synchronization Signal (eSS) symbols. The eSS symbols are simply the reference symbols corresponding to port 0 of the CRS restricted to appear only once every 5 subframes in subframe 0 and subframe 5, i.e., the same subframes in which the PSS and the SSS signals are transmitted. Control signaling on the new carrier will mainly use the ePDCCH and a modified PBCH called the enhanced PBCH (ePBCH). The PDCCH, which extends over the entire bandwidth of the carrier, will not be used. On the new carrier, all channel estimation for demodulation purposes is performed on the UE-specific DM-RS. The eSS will only be used for time and frequency synchronization. The bandwidth of the eSS is still under discussion.

As discussed above, existing techniques for differentiating or detecting different carrier types rely on different spacings between different components of an initial synchronization sequence (i.e., PSS and SSS) for different carrier types. However, these techniques increase initial search complexity because the wireless device must search for the initial synchronization sequence using different hypothesized spacings. While this complexity may be tolerated in conventional cellular communications networks (e.g., LTE Release 11 and prior), the complexity may increase, and thus become intolerable, for future cellular communications networks where, e.g., additional carrier types or carrier modes may be defined. For instance, if a separate spacing between PSS and SSS is required to enable detection of each of many different carrier types or modes, then the complexity of the initial search will increase for each new carrier type/mode.

In addition, in a heterogeneous cellular communications network, transmission of the PSS/SSS by a macro node (e.g., a macro base station) causes interference at a wireless device desiring to detect PSS/SSS from a low-power node (e.g., a pico node or a pico base station). This interference becomes even more problematic when using a high Cell Selection Offset (CSO). Existing solutions for dealing with this interference rely on interference cancellation algorithms at the wireless device, which increase the complexity of the wireless device, or misalignment of subframes in neighboring cells, which is not desirable in TDD systems with high power nodes. Such misalignment of subframes can also increase interference coordination complexity between neighboring cells in some cases.

Systems and methods are disclosed herein that address the problems described above. In particular, in some embodiments, the systems and methods disclosed herein reduce the complexity of an initial search while at the same time enabling carrier type or mode detection. In addition, in some embodiments, the systems and methods disclosed herein avoid interference at a wireless device when detecting synchronization signals (e.g., PSS and SSS) from a particular cell resulting from transmission of synchronization signals from a neighboring cell using the same time and frequency resources. This is particularly beneficial in a heterogeneous cellular communications network providing high CSO operation where the transmission of synchronization signals from a macro node can result in strong interference during detection of synchronization signals from a low-power node at a wireless device near an extended boundary of a small cell served by the low-power node.

Figure 5:
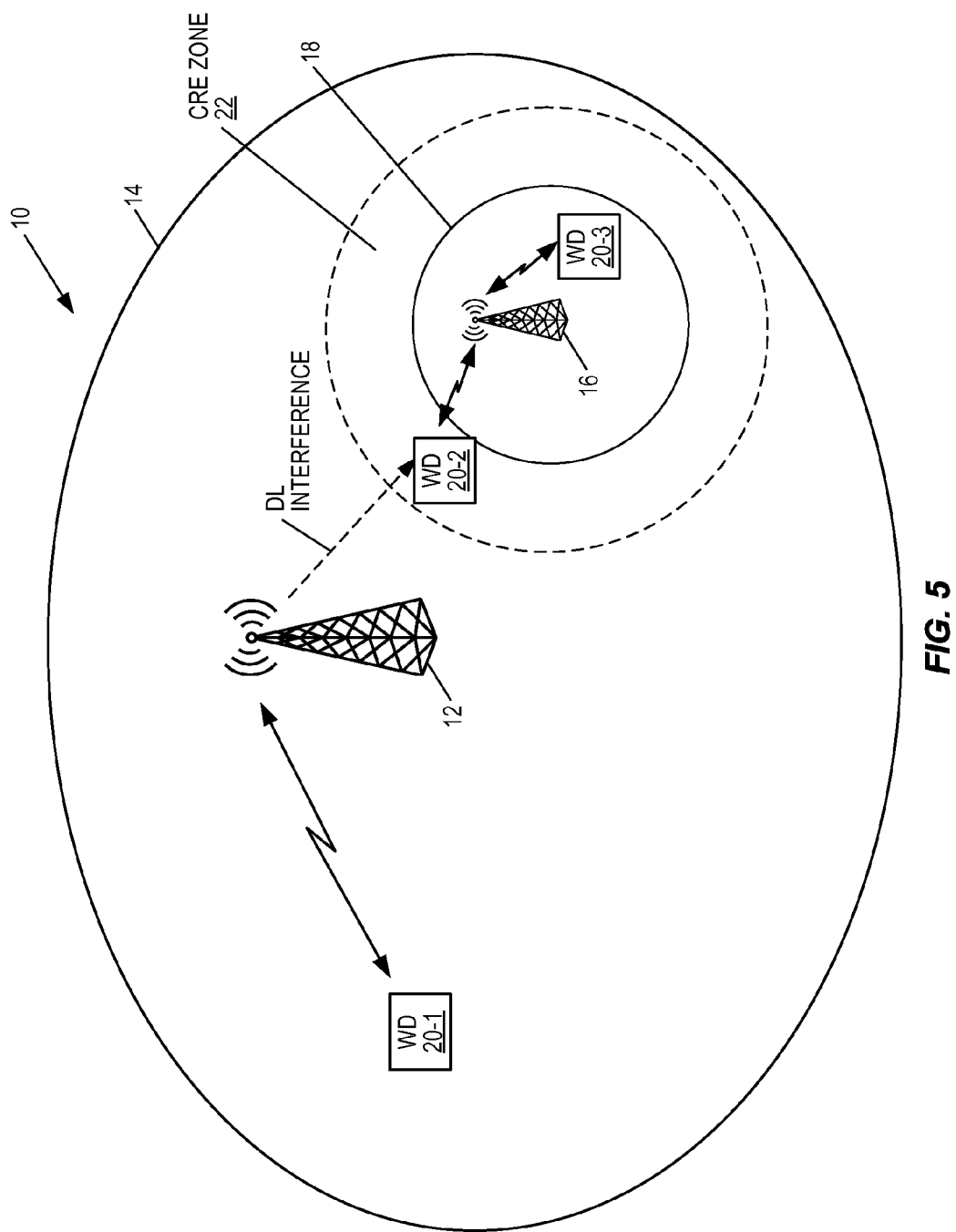
FIG. 5 illustrates one example of a cellular communications network in which low-complexity carrier characteristic detection is provided according to one embodiment of the present disclosure.

Although the described embodiments may be implemented in any appropriate type of telecommunications system supporting any suitable communications standards and using any suitable components, particular embodiments of the described solutions may be implemented in an LTE network, such as the cellular communications network 10 illustrated in FIG. 5. As shown in FIG. 5, the example cellular communications network 10 may include one or more radio access nodes capable of communicating with wireless devices, along with any additional elements suitable to support communication between wireless devices or between a wireless device and another communication device (such as a landline telephone). For example, as shown in FIG. 5, the cellular communications network 10 may include a first category of radio access nodes including a macro node 12 serving a macro cell 14 and a second category of radio access nodes including a Low-Power Node (LPN) 16 serving a small cell 18. In 3GPP LTE, the macro node 12 is referred to as an eNB or macro eNB, whereas the LPN 16 is referred to as, e.g., a pico node, a femto node, or a Home eNB (HeNB). Note that while only one LPN 16 is illustrated, there may be multiple LPNs 16 within the macro cell 14. The radio access nodes in the first category may differ from those in the second category in terms of their transmission power, their sensitivity, their maximum number of supported devices, their service area, or any other aspect of their operation. These differences may be a result of permanent differences in the capabilities or components of the relevant nodes or may result from their configuration at a given time. In the latter case, different categories may include devices that may be identical in their components and capabilities, but simply configured differently at a particular instant.

The macro node 12 and the LPN 16 provide radio, or wireless, access to wireless devices 20-1 through 20-3 (generally referred to herein collectively as wireless devices 20 and individually as wireless device 20) located within the corresponding cells 14 and 18, respectively. The wireless devices 20 served may represent conventional UEs, Machine Type Communication (MTC)/Machine-to-Machine (M2M) devices (e.g., wireless sensors and meters), Radio Frequency Identifiers (RFIDs), and/or any other type of wireless communication devices.

In this example, a high CSO is utilized to provide Cell Range Expansion (CRE) for the small cell 18 served by the LPN 16. As a result, the wireless device 20-2, which is located in a resulting CRE zone 22, is connected to the LPN 16 even though, at the wireless device 20-2, a received power for a downlink from the macro node 12 is stronger than a received power for a downlink from the LPN 16. As discussed above, this may be desirable to, e.g., offload traffic from the macro node 12 to the LPN 16 and/or to enable reception of an uplink from the wireless device 20-2 at the LPN 16 rather than the macro node 12 because received power for the uplink is greater at the LPN 16 than at the macro node 12.

As discussed above, one issue with high CSO operation when using conventional initial synchronization techniques in a synchronized network is that transmission of synchronization signals from the macro node 12 utilize the same time and frequency resources as transmission of synchronization signals from the macro node 12. As a result, when using conventional synchronization signals, the relatively high power transmission of the synchronization signals from the macro node 12 creates strong downlink interference at the wireless device 20-2 during detection of the synchronization signals from the LPN 16. As discussed below in detail, this interference can be avoided by, in some embodiments, utilizing different absolute positions for synchronization signals within a radio frame for neighboring cells such as the macro cell 14 and the small cell 18. The absolute positions for the synchronization signals may be a function of, e.g., PSS and/or SSS sequence or a cell ID of the corresponding cell.

Further, as discussed above, in LTE, the conventional synchronization signals (i.e., PSS and SSS) utilize different time-domain spacing between the PSS and the SSS for FDD and TDD carriers to thereby enable carrier type detection. While this works well when there are two carrier types, the complexity of the search increases as the number of carrier types or carrier modes increases. As used herein, a carrier type refers to the type of the carrier (e.g., a legacy FDD carrier, a legacy TDD carrier, a new FDD carrier, or a new TDD carrier). Conversely, as used herein, a carrier mode is a mode of operation for a particular carrier type. For instance, a particular carrier type may include multiple modes for different activity levels (e.g., a full active mode and a sleep mode may be defined for a FDD or a TDD carrier to enable LPNs such as the LPN 16 to enter a sleep mode when, e.g., the additional capacity provided to the LPN 16 is not needed). In some embodiments, the macro node 12 and the LPN 16 may transmit any one of multiple carrier types (e.g., legacy FDD carrier, legacy TDD carrier, new FDD carrier, or new TDD carrier) and/or a carrier according to any one of multiple modes (e.g., an active mode or a low-power sleep mode). In order to decrease the complexity of the initial search for the synchronization signals, in some embodiments, at least some and potentially all of the carrier types and/or carrier modes utilize the same time-domain spacing between the PSS and the SSS. The time-domain spacing between the PSS and the SSS represents what is referred to herein as a relative position of the PSS and the SSS (i.e., relative to one another). The carrier types and/or carrier modes can then be detected by using different absolute positions for PSS and SSS (and in some cases different relative positions for PSS and SSS) within the radio frame for the different carrier types and/or carrier modes. Furthermore, in some embodiments, the absolute position of PSS/SSS within the radio frame may vary from cell to cell. For instance, neighboring cells may utilize different absolute positions for PSS and SSS within the radio frame in order to, e.g., avoid interference. In this case, the absolute positions for PSS and SSS may be dependent on the PSS and/or the SSS sequences or the cell ID of the corresponding cell.

Even if the macro node 12 and the LPN 16 transmit PSS/SSS at different positions within the radio frame, transmission of the PSS/SSS by the macro node 12 may still create strong interference in corresponding REs in the small cell 18 served by the LPN 16. In one embodiment, the LPN 16 mutes transmission (e.g., does not transmit data) in the REs that experience strong interference due to the transmission of the PSS/SSS by the macro node 12.

Figure 6:
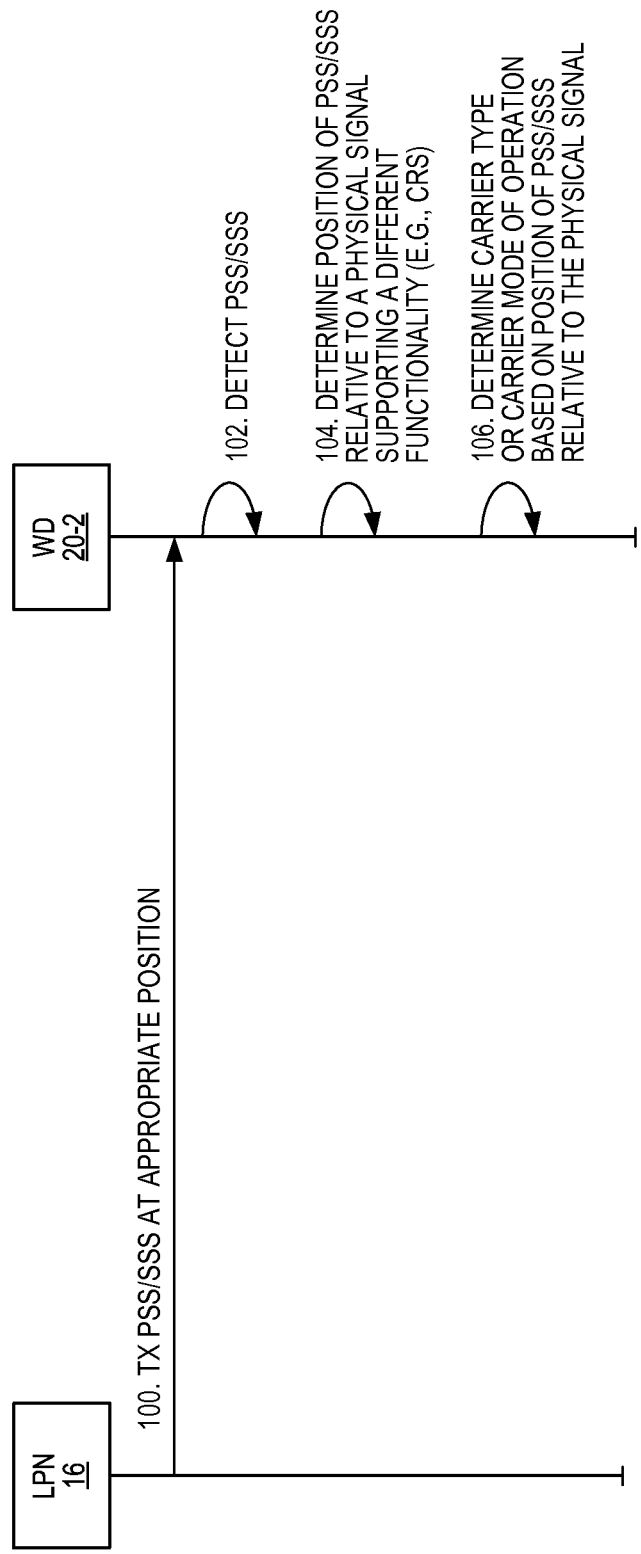
FIG. 6 illustrates a process for detecting one or more characteristics of a carrier transmitted by a radio access node according to one embodiment of the present disclosure.

FIG. 6 illustrates a process for detecting one or more characteristics of a carrier (e.g., carrier type and/or carrier mode) transmitted by a radio access node according to one embodiment of the present disclosure. In this example, the radio access node is the LPN 16 of FIG. 5, and the characteristic(s) of the carrier transmitted by the LPN 16 are detected by the wireless device 20-2. However, this process is not limited to the LPN 16 and the wireless device 20-2. This process may be performed with respect to any suitable radio access node and wireless device.

As illustrated, the LPN 16 transmits a carrier including a PSS and a SSS at an appropriate position within a radio frame (step 100). The position of the PSS or the SSS within the radio frame is indicative of one or more characteristics of the carrier such as, for example, a carrier type and/or a carrier mode. More specifically, different carrier characteristics such as, for example, different carrier types and/or different carrier modes are mapped to different PSS and/or SSS positions within the radio frame. The different PSS and/or SSS positions are, in one embodiment, different absolute positions as determined by time-domain spacing between the PSS and/or the SSS and a physical signal (e.g., a reference signal) supporting a different functionality within the radio frame. The physical signal can be any physical signal whose position within the radio frame relative to the beginning or the end of the radio frame is known. The physical signal may be, for example, a cell-specific reference signal (e.g., CRS). However, other physical signals may be used. As used herein, the functionality of the PSS/SSS is initial synchronization. As such, a physical signal supporting a different functionality is any physical signal that supports a functionality other than initial synchronization. For example, CRS supports a different functionality than PSS/SSS in that CRS supports channel estimation for coherent demodulation of most downlink physical channels, Channel State Information (CSI) acquisition, and measurements (e.g., Reference Signal Received Power (RSRP) and Reference Signal Received Quality (RSRQ)) at the wireless devices 20.

Further, the absolute position of the PSS and the SSS may vary from one cell to another in order to, e.g., avoid interference between neighboring cells. In this case, the absolute position of the PSS and the SSS may be a function of, e.g., the PSS and/or the SSS sequences or a cell ID of the small cell 18. More specifically, in one embodiment, there is a defined number (N) of absolute positions for the PSS/SSS for a particular carrier type/mode, and each unique PSS/SSS sequence or cell ID is mapped to one of the N absolute positions for the PSS/SSS for the carrier type/mode. If there are M different carrier types/modes and assuming that the same number (N) of absolute positions for the PSS/SSS are defined for each of the M different carrier types/modes (which does not have to be the case), then there are N×M possible absolute positions for the PSS/SSS.

Transmitting the PSS/SSS at the appropriate position within the radio frame also includes transmitting the PSS and the SSS with an appropriate relative position (i.e., relative to one another). In other words, the PSS and the SSS are transmitted with an appropriate time-domain spacing between the PSS and the SSS within the radio frame. In one embodiment, the relative position of the PSS and the SSS within the radio frame is the same for all cells (e.g., the same for the macro cell 14 and the small cell 18). This decreases the complexity of the initial search for the PSS and the SSS at the wireless device 20-2. However, in another embodiment, the relative position of the PSS and the SSS is also a function of the one or more characteristics of the carrier. Thus, different relative positions for the PSS and the SSS within the radio frame may be defined for one or more different carrier characteristics, e.g., carrier types and/or carrier modes. In this case, the absolute position of the PSS and/or the SSS within the radio frame together with the relative position of the PSS and the SSS identifies the one or more characteristics of the carrier.

At the wireless device 20-2, the wireless device 20-2 detects the PSS and the SSS using a search procedure (step 102). For example, the wireless device 20-2 searches for the PSS and the SSS using different possible PSS/SSS sequences and different possible positions of the PSS/SSS within the radio frame until the PSS and the SSS are detected. More specifically, in one embodiment, the same time-domain spacing between the PSS and the SSS is used for all carriers regardless of their characteristic(s) (e.g., regardless of carrier type and/or carrier mode). In this case, the wireless device 20-2 searches for the PSS and the SSS using different possible PSS/SSS sequences and a single time-domain spacing between the PSS and the SSS. In another embodiment, different time-domain spacing between the PSS and the SSS are used for at least some different carrier characteristics (e.g., at least two carrier types/modes use different time-domain spacing between the PSS and the SSS). In this case, the wireless device 20-2 searches for the PSS and the SSS using different possible PSS/SSS sequences and the different time-domain spacings between the PSS and the SSS. Once the PSS and the SSS are found, the wireless device 20-2 knows the PSS/SSS sequences used for the PSS and the SSS as well as the cell ID of the small cell 18.

The wireless device 20-2 also determines the position of the PSS or the SSS relative to a physical signal (e.g., a reference signal) supporting a different functionality (step 104). As discussed above, this position is referred to as the absolute position of the PSS or the SSS within the radio frame. Again, the physical signal can be any physical signal whose position within the radio frame relative to the beginning or the end of the radio frame is known. In one particular embodiment, the physical signal is a cell-specific reference signal (e.g., CRS). More specifically, using carrier type/mode as an example, in one embodiment, the same absolute position for PSS/SSS is used for a particular carrier type/mode for all cells. In this case, the wireless device 20-2 searches for the physical signal (e.g., CRS) using known time-domain spacings between the PSS/SSS and the physical signal for the possible absolute positions of the PSS/SSS, where each time-domain spacing corresponds to a different carrier type/mode. Once the physical signal is found, the wireless device 20-2 has determined the absolute position of the PSS/SSS within the radio frame. In another embodiment, different absolute positions for PSS/SSS are used for a particular carrier type/mode for different cells. In this case, the wireless device 20-2 may search for the physical signal (e.g., CRS) using all possible time-domain spacings between the PSS/SSS and the physical signal for the different carrier types/modes for all cells. Alternatively, in order to reduce the complexity of the search, the absolute positions of the PSS/SSS for the different carrier types/modes is a function of the PSS/SSS sequence or cell ID. The wireless device 20-2 may then utilize the PSS/SSS sequence of the detected PSS/SSS or the corresponding cell ID to determine the possible absolute positions of the PSS/SSS for the different carrier types/modes for the small cell 18. The wireless device 20-2 may then search for the physical signal using the time-domain spacings between the PSS/SSS and the physical signal for the possible absolute positions of the PSS/SSS for the different carrier types/modes for the small cell 18. Once the physical signal is found, the absolute position of the PSS/SSS within the radio frame is known.

The wireless device 20-2 then determines one or more characteristics of the carrier based on the position of the PSS and/or the SSS relative to the physical signal supporting a different functionality (i.e., based on the absolute position of the PSS and/or the absolute position of the SSS within the radio frame) (step 106). In some embodiments, the determination of the one or more characteristics of the carrier is further based on the time-domain spacing between the PSS and the SSS). In this example, the one or more characteristics of the carrier include the carrier type of the carrier and/or the carrier mode of the carrier. More specifically, as discussed above, the absolute position of the PSS and/or the SSS within the radio frame (together with the relative position of the PSS and the SSS in some embodiments) is indicative of the one or more characteristics of the carrier. As such, by using predefined mappings between different carrier characteristics and different absolute positions of the PSS and/or the SSS (and in some embodiments relative positions of the PSS and the SSS), the wireless device 20-2 is able to determine the one or more characteristics of the carrier. These mappings may be static mappings stored at the wireless device 20-2 (e.g., defined by standards) or configurable mappings that are configured by the cellular communications network 10.

Figure 7A:
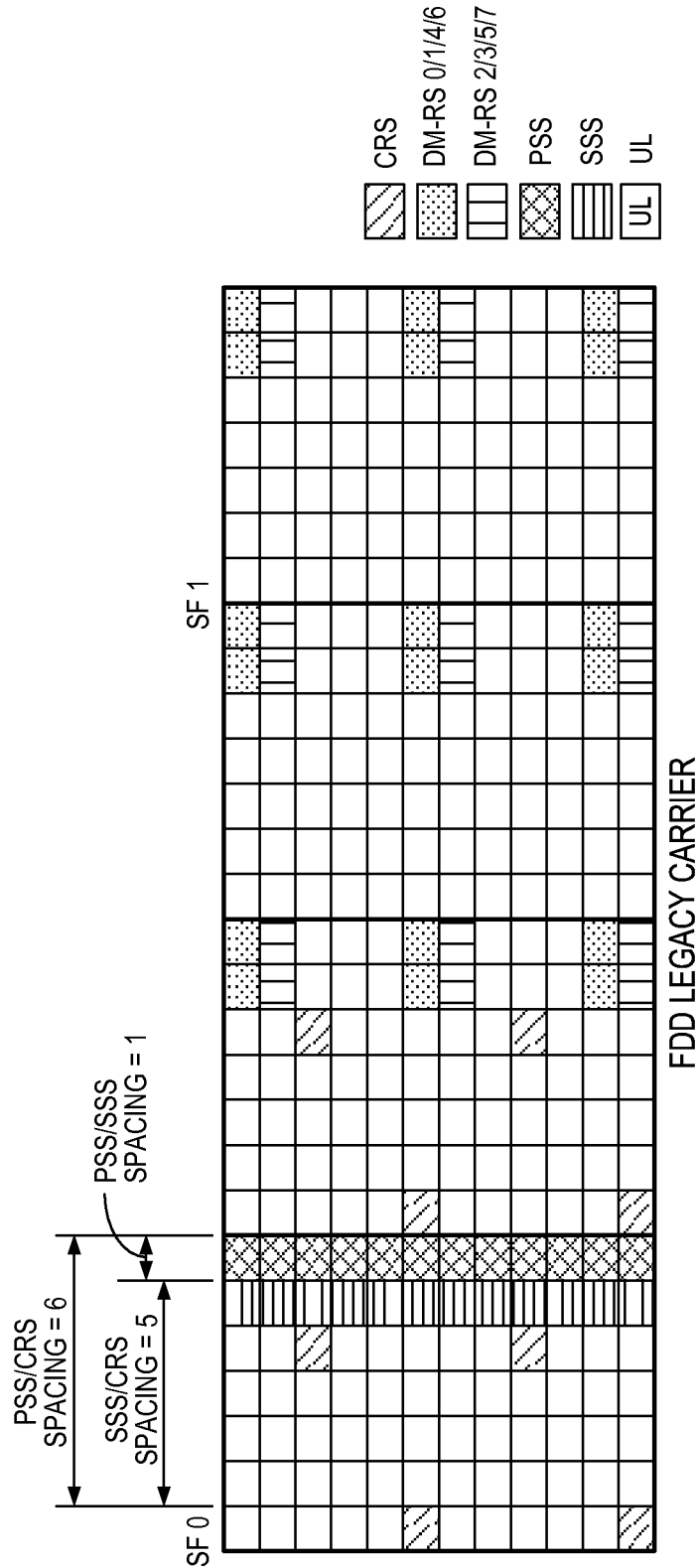
FIGS. 7A and 7B illustrate positions of PSS and SSS for legacy Frequency Division Duplexing (FDD) and Time Division Duplexing (TDD) in LTE.
Figure 7B:
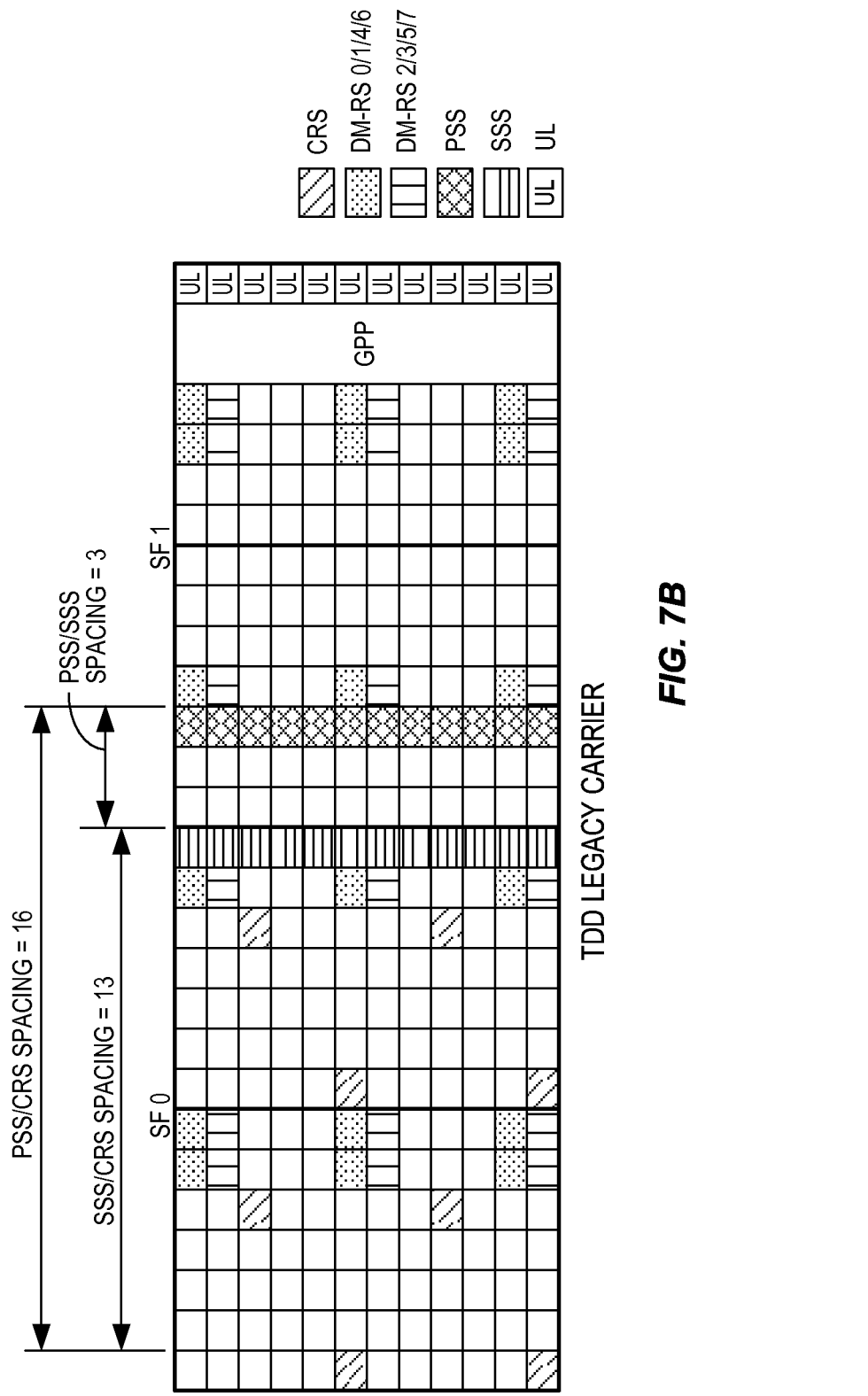

FIGS. 7A, 7B, 8A, and 8B illustrate different PSS/SSS positions that are indicative of different carrier types according to one embodiment of the present disclosure. In a similar manner, different PSS/SSS positions may be defined for different carrier modes. FIGS. 7A, 7B, 8A, and 8B are only examples and are not intended to limit the scope of the present disclosure. In particular, FIGS. 7A and 7B illustrate the positions of the PSS and the SSS for legacy FDD and TDD carriers in LTE. These legacy carriers are the carriers defined in Release 11 and prior releases of the LTE standards. As illustrated in FIG. 7A, the absolute position of the PSS in the legacy FDD carrier type corresponds to a time-domain spacing of 6 OFDM symbol periods from a first CRS in subframe (SF) 0, and the absolute position of the SSS in the legacy FDD carrier type corresponds to a time-domain spacing of 5 OFDM symbol periods from the first CRS in subframe (SF) 0. The relative position of the PSS and the SSS for the legacy FDD carrier type corresponds to a time-domain spacing of 1 OFDM symbol period. Conversely, as illustrated in FIG. 7B, the absolute position of the PSS in the legacy TDD carrier type corresponds to a time-domain spacing of 16 OFDM symbol periods from a first CRS in subframe (SF) 0, and the absolute position of the SSS in the legacy TDD carrier type corresponds to a time-domain spacing of 13 OFDM symbol periods from the first CRS in subframe (SF) 0. The relative position of the PSS and the SSS for the legacy TDD carrier type corresponds to a time-domain spacing of 3 OFDM symbol periods.

Figure 8A:
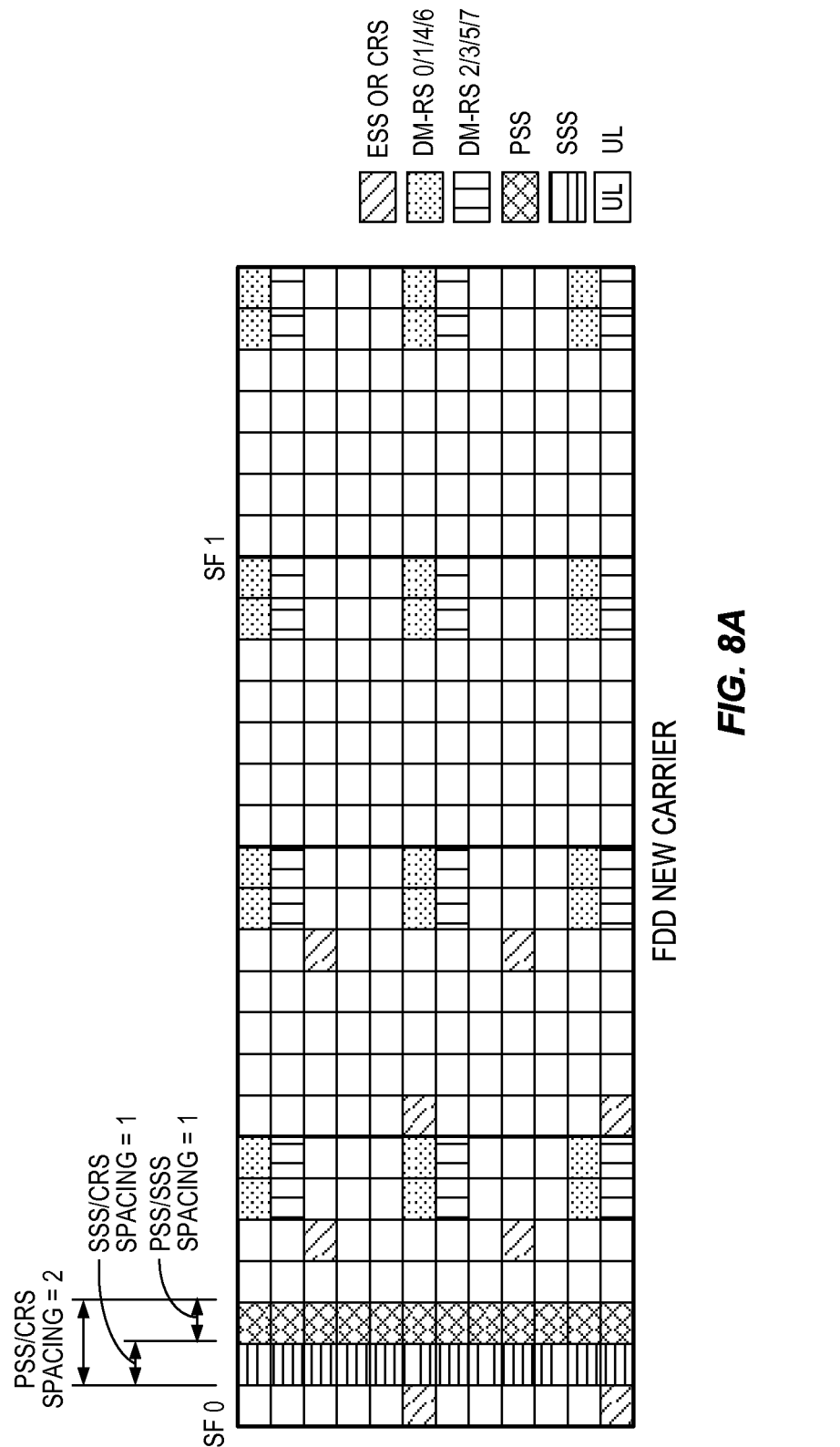
FIGS. 8A and 8B illustrate positions of PSS and SSS for one example of a new carrier type for FDD and TDD.
Figure 8B:
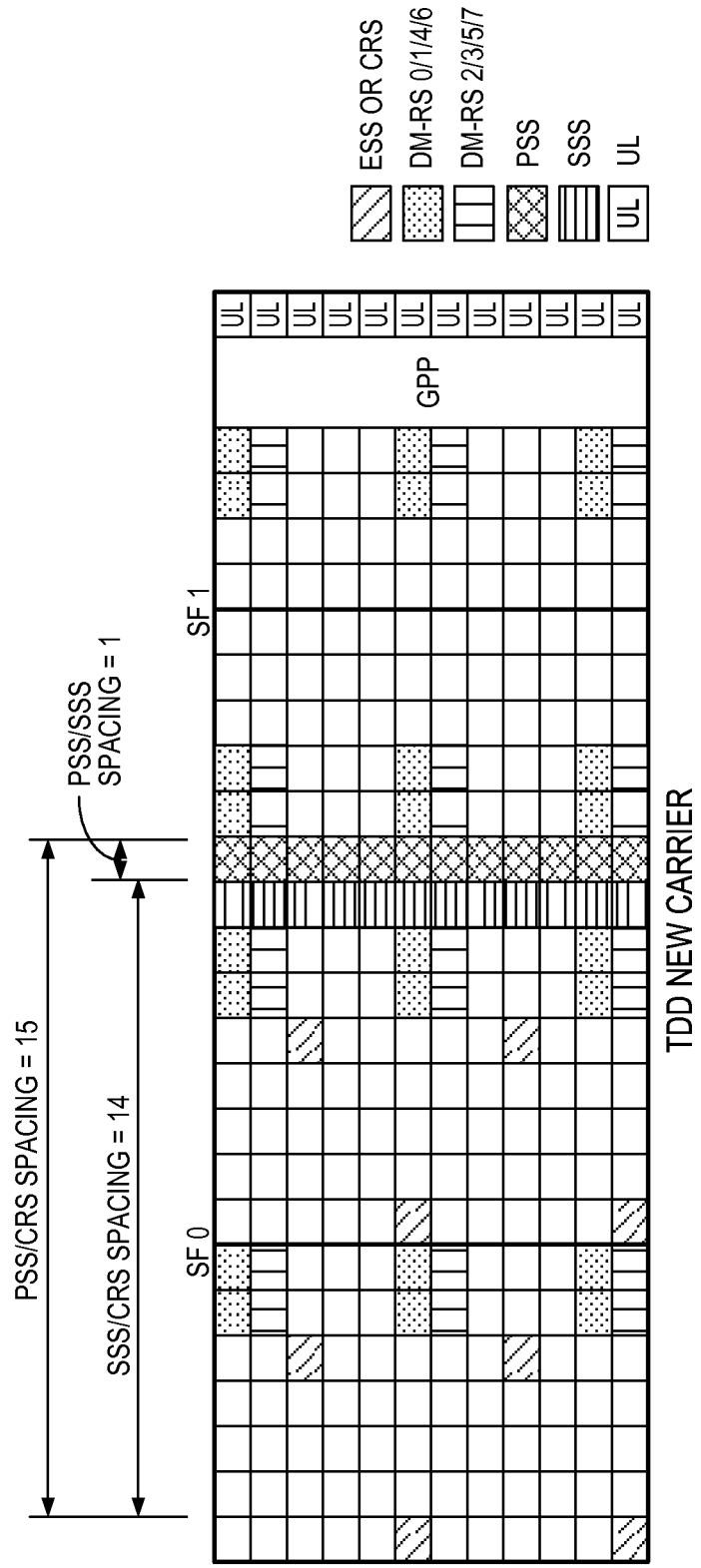

FIGS. 8A and 8B illustrate the positions of the PSS and the SSS for examples of new FDD and TDD carriers for LTE. These new carriers are new carriers that may potentially be defined in future releases of LTE. As illustrated in FIG. 8A, the absolute position of the PSS in the new FDD carrier type corresponds to a time-domain spacing of 2 OFDM symbol periods from a first CRS in subframe (SF) 0, and the absolute position of the SSS in the new FDD carrier type corresponds to a time-domain spacing of 1 OFDM symbol period from the first CRS in subframe (SF) 0. The relative position of the PSS and the SSS for the new FDD carrier type corresponds to a time-domain spacing of 1 OFDM symbol period. Conversely, as illustrated in FIG. 8B, the absolute position of the PSS in the new TDD carrier type corresponds to a time-domain spacing of 15 OFDM symbol periods from a first CRS in subframe (SF) 0, and the absolute position of the SSS in the new TDD carrier type corresponds to a time-domain spacing of 14 OFDM symbol periods from the first CRS in subframe (SF) 0. The relative position of the PSS and the SSS for the new TDD carrier type also corresponds to a time-domain spacing of 1 OFDM symbol period. Notably, the absolute positions of the PSS/SSS may vary from one cell to another, as discussed above.

Using the examples of FIGS. 7A, 7B, 8A, and 8B, a wireless device 20 can detect the carrier type of a carrier by searching for PSS/SSS using:

1) PSS/SSS time-domain spacing of 1 and a PSS/CRS time-domain spacing of 2 (for the new FDD carrier type),
2) PSS/SSS time-domain spacing of 1 and a SSS/CRS time-domain spacing of 1 (for the new FDD carrier type),
3) PSS/SSS time-domain spacing of 1 and a PSS/CRS time-domain spacing of 6 (for the legacy FDD carrier type),
4) PSS/SSS time-domain spacing of 1 and a SSS/CRS time-domain spacing of 5 (for the legacy FDD carrier type),
5) PSS/SSS time-domain spacing of 1 and a PSS/CRS time-domain spacing of 15 (for the new TDD carrier type),
6) PSS/SSS time-domain spacing of 1 and a SSS/CRS time-domain spacing of 14 (for the new TDD carrier type), and
7) PSS/SSS time-domain spacing of 3 (for the legacy TDD carrier type).

Figure 9:
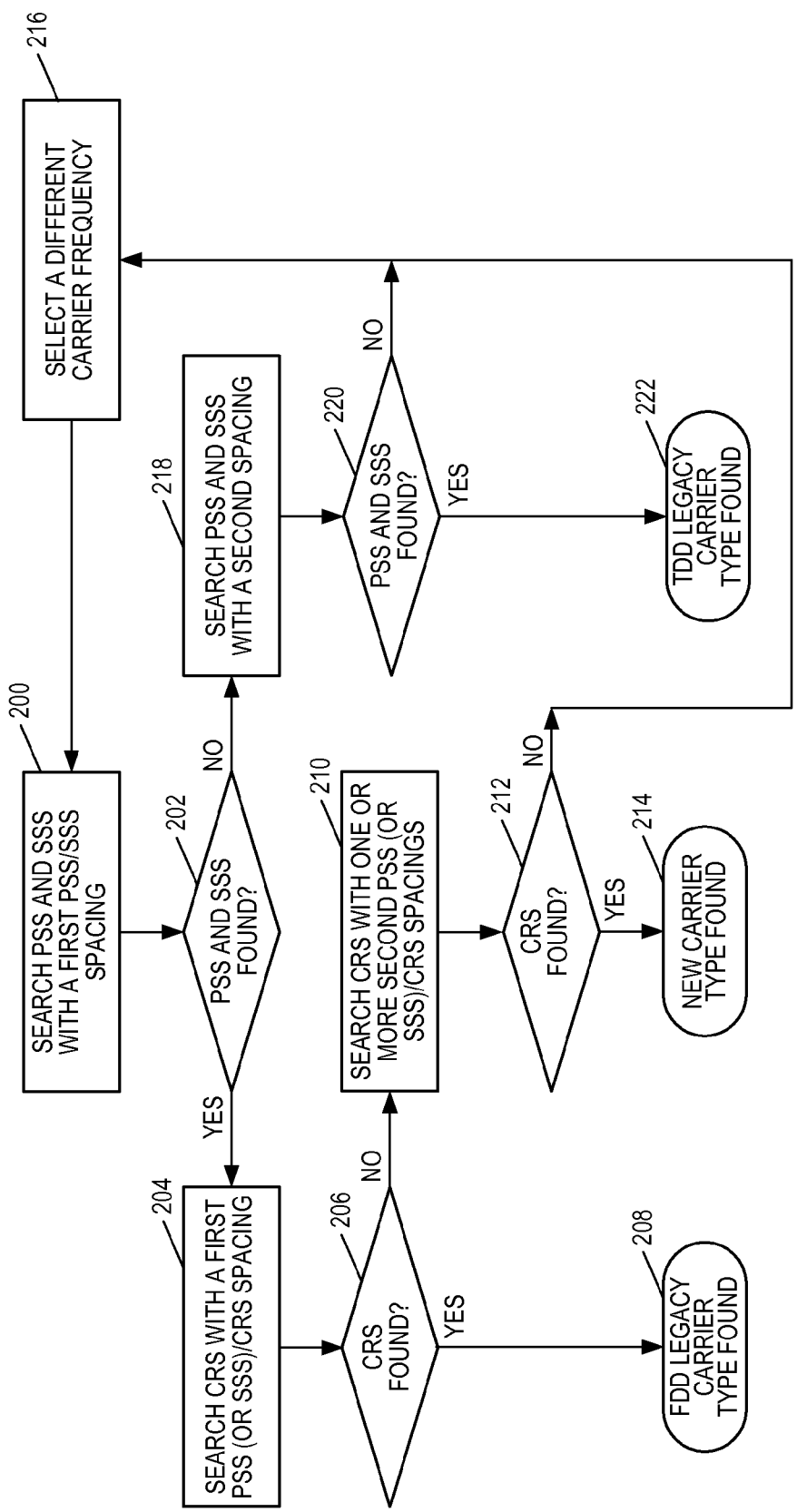
FIG. 9 illustrates the operation of a wireless device to perform carrier type detection according to one embodiment of the present disclosure.

FIG. 9 is a flow chart that illustrates the operation of one of the wireless devices 20 to perform carrier type detection according to one embodiment of the present disclosure. While this example focuses on carrier type detection, a similar process can be used to detect other carrier characteristics (e.g., carrier mode). As illustrated, the wireless device 20 first searches for the PSS and the SSS with a first time-domain spacing between the PSS and the SSS, which is also referred to herein as the PSS/SSS spacing (step 200). Using the example of FIGS. 7A, 7B, 8A, and 8B, the first PSS/SSS time-domain spacing is a time-domain spacing of 1 OFDM symbol period. The wireless device 20 determines whether the PSS and the SSS were found using the first PSS/SSS time-domain spacing (step 202). If so, the wireless device 20 searches for, in this example, CRS using a first time-domain spacing between the PSS and the CRS (which is also referred to herein as the PSS/CRS time-domain spacing) or, alternatively, a first time-domain spacing between the SSS and the CRS (which is also referred to herein as the SSS/CRS time-domain spacing) (step 204).

Again, using the example of FIGS. 7A, 7B, 8A, and 8B, if the PSS and the SSS are found using the first PSS/SSS time-domain spacing, then the carrier type is either the legacy FDD carrier type, the new FDD carrier type, or the new TDD carrier type. Continuing this example, in one embodiment of step 204, the wireless device 20 searches for CRS using a first PSS/CRS time-domain spacing of 6 OFDM symbol periods. This PSS/CRS time-domain spacing corresponds to the legacy FDD carrier type. Alternatively, in step 204, the wireless device 20 searches for CRS using a first SSS/CRS time-domain spacing of 5 OFDM symbol periods, which again corresponds to the legacy FDD carrier type.

The wireless device 20 then determines whether CRS were found using the first PSS (or SSS)/CRS time-domain spacing (step 206). If so, the wireless device 20 determines that the carrier is of the legacy FDD carrier type (step 208). If CRS was not found using the first PSS (or SSS)/CRS time-domain spacing, then, in this embodiment, the wireless device 20 searches for CRS using one or more second PSS (or SSS)/CRS time-domain spacings (step 210). Continuing the example above, if CRS was not found using the first PSS (or SSS)/CRS time-domain spacing, then the carrier is of either the new FDD carrier type or the new TDD carrier type. As such, in step 210, the wireless device 20 searches for CRS using: (1) a second PSS (or SSS)/CRS time-domain spacing for the new FDD carrier type (i.e., an OFDM symbol spacing of 2 for PSS/CRS time-domain spacing or an OFDM symbol spacing of 1 for SSS/CRS time-domain spacing) and (2) a second PSS (or SSS)/CRS time-domain spacing for the new TDD carrier type (i.e., an OFDM symbol spacing of 15 for PSS/CRS time-domain spacing or an OFDM symbol spacing of 14 for SSS/CRS time-domain spacing).

In one embodiment, the second PSS (or SSS)/CRS time-domain spacing(s) is (are) the same for all cells. However, in other embodiment, the second PSS (or SSS)/CRS time-domain spacing(s) is (are) are a function of the PSS and/or the SSS sequence of the detected PSS/SSS or a corresponding cell ID (which for LTE is determined from the PSS/SSS sequence). More specifically, using the new FDD/TDD carrier types of FIGS. 8A and 8B as an example, in one embodiment, there are N1 possible PSS (or SSS)/CRS time-domain spacings for the new FDD carrier type and N2 possible PSS (or SSS)/CRS time-domain spacings for the new TDD carrier type, where N1 and N2 are both greater than 1 and N1 may or may not be equal to N2. In this case, each PSS/SSS sequence (or cell ID) is mapped to one of the N1 possible PSS (or SSS)/CRS time-domain spacings for the new FDD carrier type and one of the N2 possible PSS (or SSS)/CRS time-domain spacings for the new TDD carrier type. Preferably, neighboring cells would be mapped to different spacings in order to avoid interference. The wireless device 20 then searches for CRS using the PSS (or SSS)/CRS time-domain spacings mapped to the PSS/SSS sequences for the detected PSS/SSS (or the corresponding cell ID).

After searching for CRS in step 210, the wireless device 20 determines whether CRS was found using the second PSS (or SSS)/CRS spacing(s) (step 212). If the wireless device 20 determines that CRS was found using the second PSS (or SSS)/CRS time domain spacing(s), the wireless device 20 determines that the carrier is of the corresponding new carrier types (step 214). If CRS is not found, then the wireless device 20 has been unable to detect the carrier type of the carrier. As such, the wireless device 20 selects a different carrier frequency (step 216), and the process returns to step 200 and is repeated.

Returning to step 202, if the PSS and the SSS were not found using the first PSS/SSS spacing in step 200, then the wireless device 20 searches for the PSS and the SSS using a second PSS/SSS time-domain spacing (step 218). Again, continuing the example from above, if the PSS and the SSS were not found using the first PSS/SSS time-domain spacing, then the carrier is not of the legacy FDD carrier type or the new FDD or TDD carrier types. As such, in order to determine whether the carrier is of the legacy TDD carrier type, the wireless device 20 searches for the PSS and the SSS in step 218 using a second PSS/SSS time-domain spacing of 3 OFDM symbol periods, which corresponds to the legacy TDD carrier type.

The wireless device 20 then determines whether the PSS and the SSS were found using the second PSS/SSS time-domain spacing (step 220). If so, the wireless device 20 determines that the carrier is of the legacy TDD carrier type (step 222). Otherwise, the wireless device 20 has been unable to detect the carrier type of the carrier. As such, the wireless device 20 selects a different carrier frequency (step 216), and the process returns to step 200 and is repeated.

Figure 10:
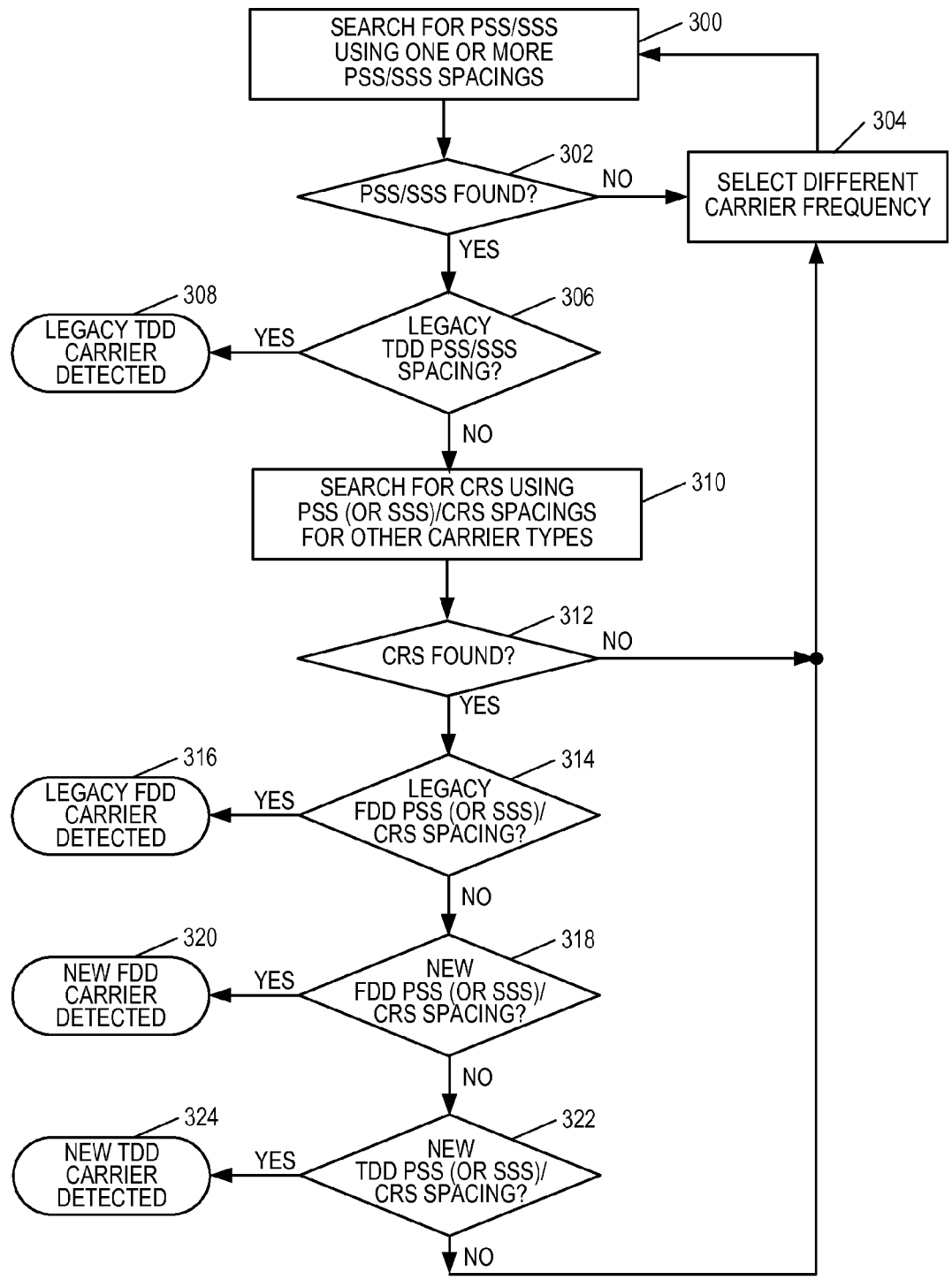
FIG. 10 illustrates the operation of a wireless device to perform carrier type detection according to another embodiment of the present disclosure.

FIG. 10 is a flow chart that illustrates the operation of one of the wireless devices 20 to perform carrier type detection according to one embodiment of the present disclosure. While this example focuses on carrier type detection, a similar process can be used to detect other carrier characteristics (e.g., carrier mode). As illustrated, the wireless device 20 first searches for the PSS and the SSS with one or more predefined PSS/SSS time-domain spacings (step 300). In the example of FIGS. 7A, 7B, 8A, and 8B, the predefined PSS/SSS time-domain spacings are a spacing of 1 OFDM symbol period, which corresponds to the legacy FDD carrier type and the new FDD and TDD carrier types, and a spacing of 3 OFDM symbol periods, which corresponds to the legacy TDD carrier type. The wireless device 20 then determines whether the PSS and the SSS are found (step 302). If not, the wireless device 20 selects a different carrier frequency (step 304), and the process then returns to step 300 and is repeated.

If the PSS and the SSS are found, the wireless devices 20 determines whether the PSS/SSS time-domain spacing for the detected PSS and SSS corresponds to the legacy TDD PSS/SSS time-domain spacing (step 306). If so, the wireless device 20 determines that the carrier is of the legacy TDD carrier type (step 308). If the PSS/SSS time-domain spacing for the detected PSS and SSS does not correspond to the legacy TDD PSS/SSS time-domain spacing, the wireless device 20 searches for, in this example, CRS using known PSS (or SSS)/CRS time-domain spacings for the other carrier types (step 310). These PSS (or SSS)/CRS time-domain spacings may be the same for all cells or may be a function of, e.g., the detected PSS and/or SSS sequence or the cell ID of the corresponding cell, as discussed above.

The wireless device 20 then determines whether CRS has been found (step 312). If not, the process proceeds to step 304, as described above. However, if CRS has been found, the wireless device 20 determines whether the PSS (or SSS)/CRS time-domain spacing corresponds to the PSS (or SSS)/CRS time-domain spacing for the legacy FDD carrier type (step 314). If so, the wireless device 20 determines that the carrier is of the legacy FDD carrier type (step 316). If not, the wireless device 20 determines whether the PSS (or SSS)/CRS time-domain spacing corresponds to the PSS (or SSS)/CRS time-domain spacing for the new FDD carrier type (step 318). If so, the wireless device 20 determines that the carrier is of the new FDD carrier type (step 320). If not, the wireless device 20 determines whether the PSS (or SSS)/CRS time-domain spacing corresponds to the PSS (or SSS)/CRS time-domain spacing for the new TDD carrier type (step 322). If so, the wireless device 20 determines that the carrier is of the new TDD carrier type (step 324). If not, the wireless device 20 proceeds to step 304, and the process is repeated as described above.

Using the embodiment of, e.g., FIG. 9 or FIG. 10, if the macro node 12 uses, e.g., a new carrier type and the LPN 16 uses, e.g., a legacy carrier type, or vice-versa, Radio Resource Management (RRM) measurements and initial synchronization operations can be performed on the LPN 16 with a high CSO without an interference cancellation algorithm at the wireless device 20-2 since the PSS/SSS do not interfere with each other. There may be some data interference, but immunity against this interference can be increased by averaging over many subframes carrying the PSS/SSS. However, if both the macro node 12 and the LPN 16 use the same carrier type and the cellular communications network 10 is synchronized on both an OFDM symbol and radio frame level, the PSS/SSS on both the macro and low-power layers interfere with each other. In this situation, interference cancellation may be desired at the wireless device 20-2 in order to operate with high CSO, thus increasing the complexity of the wireless device 20-2.

Figure 11:
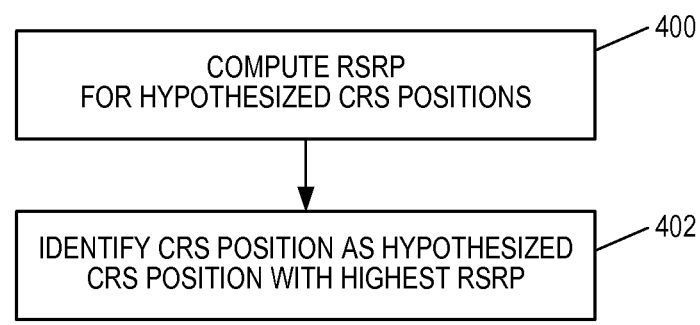
FIG. 11 illustrates a process for a search for a Common Reference Signal (CRS) according to one embodiment of the present disclosure.

FIG. 11 is a flow chart that illustrates a process for searching for CRS according to one embodiment of the present disclosure. This process may be used in, for example, step 210 of FIG. 9 or step 310 of FIG. 10. Before discussing this embodiment, a brief discussion of RRM measurements in LTE is beneficial. RRM measurements are composed of two types of measurements, namely, RSRP measurements and RSRQ measurements. RSRP measurements measure the strength of the signal received from the desired radio access node (e.g., the macro node 12 or the LPN 16). RSRP measurements are typically based on CRS. RSRQ measurements additionally involve measuring the interference on all REs including REs other than the CRS.

In the process of FIG. 11, an overlap between the RRM procedure and carrier type/mode detection is utilized to simply implementation. In particular, the RSRP measurement functionality of the RRM procedure is utilized for the CRS search. More specifically, as illustrated, the wireless device 20 computes RSRP measurements for one or more hypothesized CRS positions (step 400). The hypothesized CRS positions correspond to the one or more possible positions of the CRS relative to the detected PSS/SSS, as discussed above. The wireless device 20 then identifies the hypothesized CRS position having the highest RSRP measurement as the CRS position (step 402). In one embodiment, if the highest RSRP is not greater than a predefined threshold, the wireless device 20 may determine that CRS has not been found.

Using the process of FIG. 11, the RSRP measurement functionality is reused for both CRS detection and RRM. Once the CRS position is determined, the corresponding RSRP measurement can be used for RRM. Further, for RSRQ, interference measurements needed over all REs are performed for only one hypothesized CRS location rather than for all hypothesized CRS locations. This allows for lower complexity for RSRQ measurements when multiple carrier types/modes are being searched.

While the embodiments described above primarily focus on the use of PSS/SSS and a physical signal (e.g., CRS), the present disclosure is not limited thereto. In particular, one or more characteristics of the carrier may more generally be detected based on the time-domain spacing between any two or more physical signals that support different functionality. These two or more signals may include, as in the embodiments above, a reference signal (e.g., CRS) and either the PSS or the SSS. In this case, the PSS/SSS supports one function (i.e., initial synchronization/cell search) while the reference signal (e.g., CRS) supports a different function (e.g., channel estimation for coherent demodulation and CSI acquisition by the wireless devices 20). As another example, the two or more physical signals may include two reference signals such as, for example, CRS and DM-RS.

Figure 12:
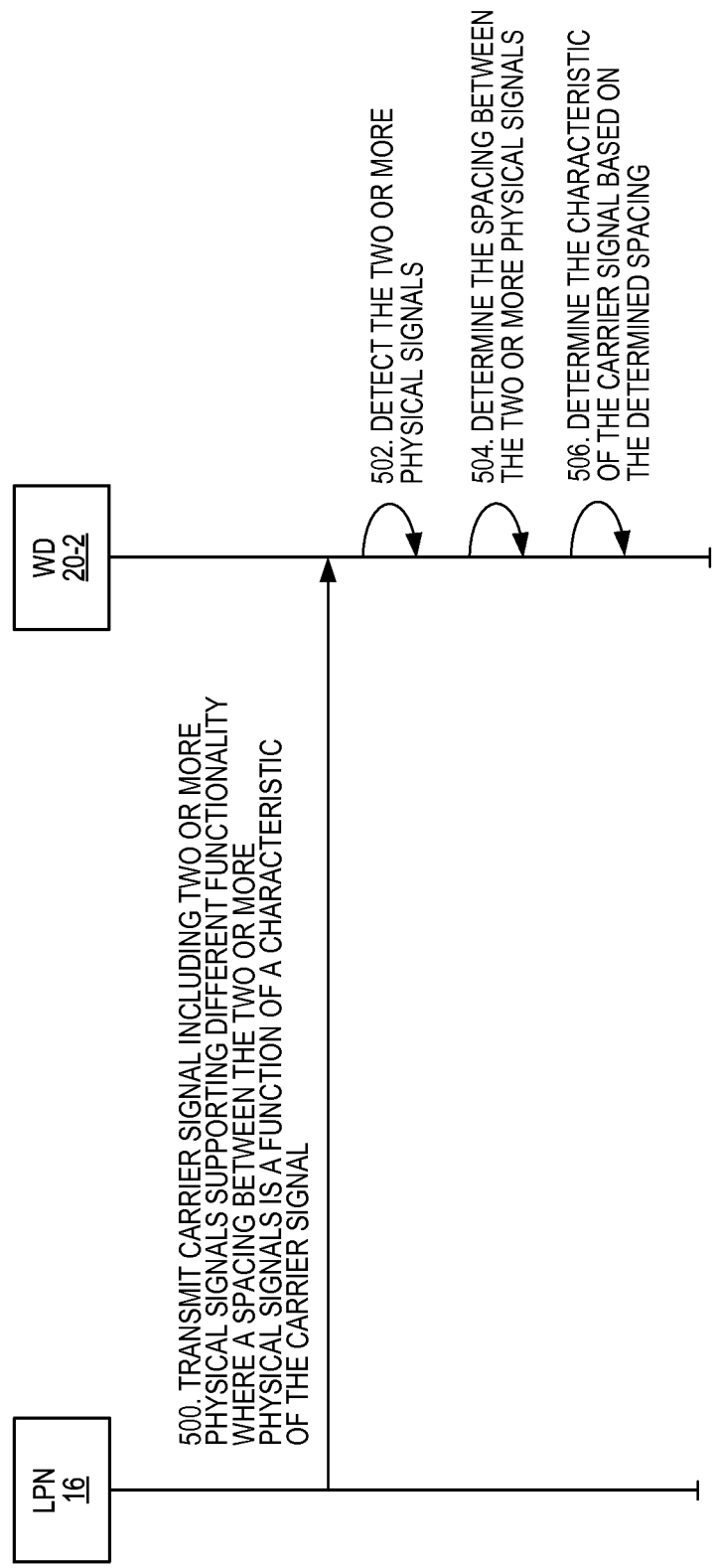
FIG. 12 illustrates a process for detecting one or more characteristics of a carrier transmitted by a radio access node according to another embodiment of the present disclosure.

In this regard, FIG. 12 illustrates a process for detecting one or more characteristics of a carrier (e.g., carrier type and/or carrier mode) transmitted by a radio access node according to another embodiment of the present disclosure. In this example, the radio access node is the LPN 16 of FIG. 5, and the characteristic(s) of the carrier transmitted by the LPN 16 are detected by the wireless device 20-2. However, this process is not limited to the LPN 16 and the wireless device 20-2. This process may be performed with respect to any suitable radio access node and wireless device.

As illustrated, the LPN 16 transmits a carrier signal including two or more physical signals supporting different functionality at an appropriate position within a radio frame (step 500). In one embodiment, the two or more physical signals include a first physical signal that supports initial synchronization and cell identification (e.g., PSS or SSS) and a second physical signal that supports a functionality other than initial synchronization and cell identification (e.g., a reference signal such as, for example, CRS). A spacing between the two or more physical signals is a function of, or indicative of, a characteristic of the carrier signal (e.g., carrier type or carrier mode). The spacing between the two or more physical signals is preferably a time-domain spacing between the two or more physical signals. In one embodiment, for a particular characteristic (e.g., a particular carrier type or a particular carrier mode), the time-domain spacing between the two or more physical signals may be the same for all cells. Thus, for a particular carrier type/mode (e.g., for carrier type/mode X), the time-domain spacing between the two or more physical signals may be the same for all cells transmitting a carrier of type/mode X. In another embodiment, for at least one of the possible carrier characteristics (e.g., a particular carrier type or a particular carrier mode), the time-domain spacing between the two or more physical signals that indicates that carrier characteristics may vary from one cell to another. Thus, for a particular carrier type/mode (e.g., carrier type/mode X), the time-domain spacing between the two or more physical signals for that carrier type/mode in one cell (e.g., the macro cell 14) may be different than the time-domain spacing between the two or more physical signals for that carrier type/mode in another cell (e.g., the small cell 18). As such, a predefined mapping between time-domain spacings and carrier characteristics for the different cells (e.g., the macro cell 14 and the small cell 18) is known to the wireless device 20-2 (e.g., defined by a standard or configured by the cellular communications network 10).

At the wireless device 20-2, the wireless device 20-2 detects the two or more physical signals (step 502). More specifically, in one embodiment, the wireless device 20-2 searches for the two or more physical signals using different possible spacings between the two or more physical signals. Again, in one embodiment, the possible spacings are a function of the cell (e.g., a function of the PSS and/or the SSS sequence detected during initial synchronization or a function of a cell ID of the small cell 18). The wireless device 20-2 also determines the time-domain spacing between the two or more physical signals (step 504). Notably, in some implementations, the time-domain spacing between the two or more physical signals may be known once the two or more physical signals are detected. For example, the time-domain spacing between the two or more physical signals is the time-domain spacing at which the two or more physical signals were successfully found using the search procedure discussed above. The wireless device 20-2 then determines the characteristic of the carrier signal based on the time-domain spacing between the two or more physical signals (step 506).

Figure 13:
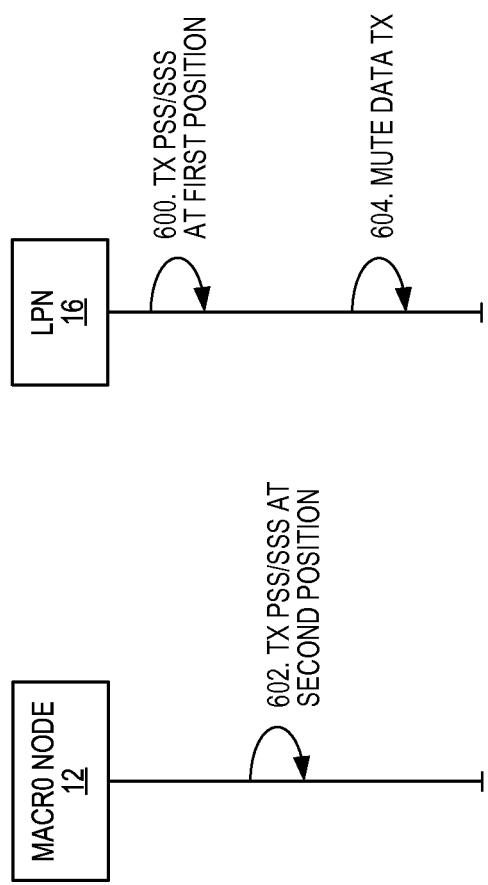
FIG. 13 illustrates a process by which a radio access node mutes data transmission on resources that experience strong interference from PSS/SSS transmission from a neighboring node according to one embodiment of the present disclosure.

As discussed above, in some embodiments, neighboring radio access nodes (e.g., the macro node 12 and the LPN 16) may utilize the different PSS/SSS positions. While this avoids interference at, e.g., the wireless device 20-2 during detection of the PSS/SSS from the LPN 16 due to PSS/SSS transmission from the macro node 12, the PSS/SSS transmission from the macro node 12 may still cause strong interference to some REs in the small cell 18 used for data transmission. FIG. 13 illustrates a process by which the LPN 16 mutes data transmission on REs that experience strong interference from PSS/SSS transmission from the macro node 12 according to one embodiment of the present disclosure. As illustrated, the LPN 16 transmits PSS/SSS at a first position within the radio frame (step 600). The macro node 12 transmits PSS/SSS at a second position within the radio frame (step 602). The LPN 16 mutes data transmission (e.g., does not transmit data) on REs that experience strong interference due to the PSS/SSS transmission from the macro node 12 in step 602 (step 604). In this manner, interference is mitigated.

While the embodiments above have focused on carrier characteristic (e.g., carrier type or carrier mode) detection, some of the concepts disclosed herein are not limited to carrier characteristic detection. For example, the concepts disclosed herein can be utilized to transmit PSS/SSS at different absolute positions within the radio frame for different cells, e.g., neighboring cells, in order to avoid interference during initial synchronization. This may be done with or without carrier characteristic detection. For instance, different cells may utilize different absolute positions for PSS/SSS regardless of whether the different absolute positions for PSS/SSS are indicative of a carrier characteristic. For example, the macro node 12 may transmit PSS/SSS at a first absolute position within the radio frame, and the LPN 16 may transmit the PSS/SSS at a second absolute position within the radio frame. Further, the absolute position of the PSS/SSS for a cell (e.g., the macro cell 14 or the small cell 18) is, in one embodiment, a function of the PSS/SSS sequence for the cell or the cell ID of the cell. Thus, upon detecting the PSS/SSS sequence (or determining the cell ID) for, e.g., the small cell 18, the wireless device 20-2 can determine the absolute position of the PSS/SSS within the radio frame as a function of the PSS/SSS sequence (or cell ID) to thereby obtain initial synchronization (i.e., determine radio frame timing).

Figure 16:
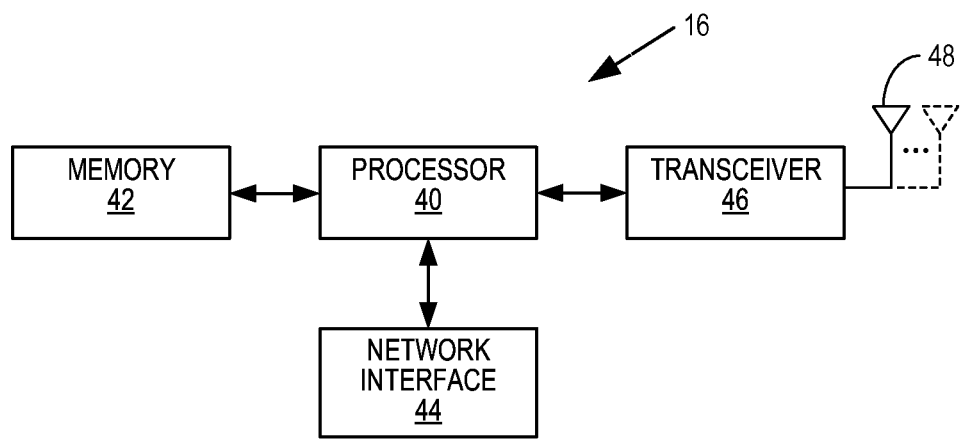
FIG. 16 is a block diagram of a Low-Power Node (LPN) of FIG. 5 according to one embodiment of the present disclosure.
Figure 17:
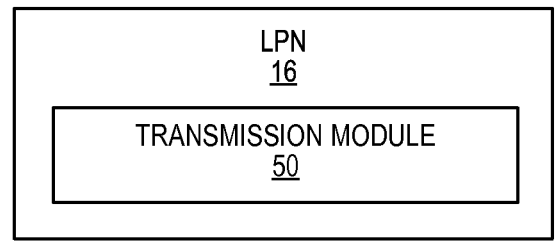
FIG. 17 is a block diagram of the LPN of FIG. 5 according to another embodiment of the present disclosure.

Similarly, although the illustrated radio access nodes may represent network nodes that include any suitable hardware or combination of hardware and/or software, these radio access nodes include a first category of access nodes such as the example macro node 12 and a second category of access nodes such as the LPN 16. Example embodiments of the macro node 12 are illustrated in FIGS. 14 and 15, and example embodiments of the LPN 16 are illustrated in FIGS. 16 and 17.

Figure 14:
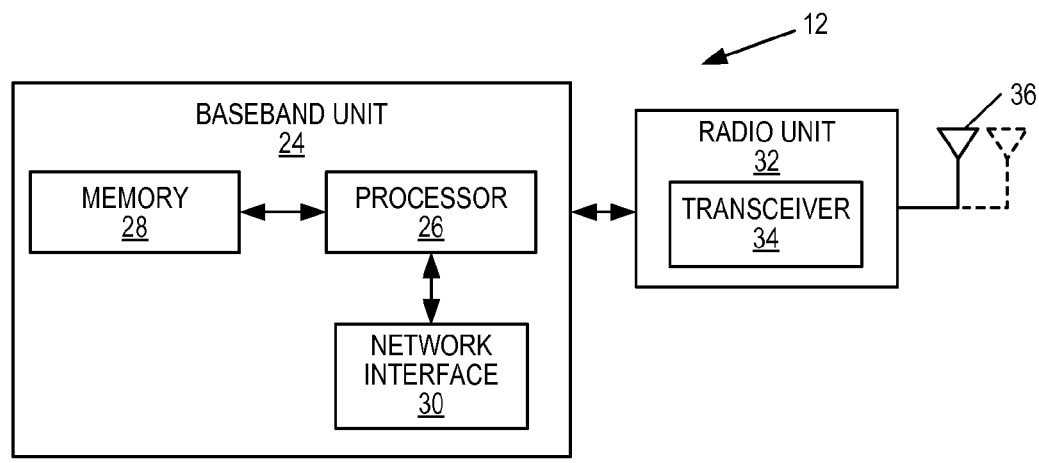
FIG. 14 is a block diagram of a macro node of FIG. 5 according to one embodiment of the present disclosure.

In the embodiment of FIG. 14, the macro node 12 includes a baseband unit 24 including a processor 26, a memory 28, and a network interface 30, and a radio unit 32 including a transceiver 34 coupled to one or more antennas 36. In particular embodiments, some or all of the functionality described above as being provided by the macro node 12 may be provided by the processor 26 executing instructions stored on a computer-readable medium (e.g., a non-transitory computer readable medium), such as the memory 28 illustrated in FIG. 14. Some embodiments of the macro node 12 may include additional components responsible for providing additional functionality, including any of the functionality identified above and/or any functionality necessary to support the solution described above.

Figure 15:
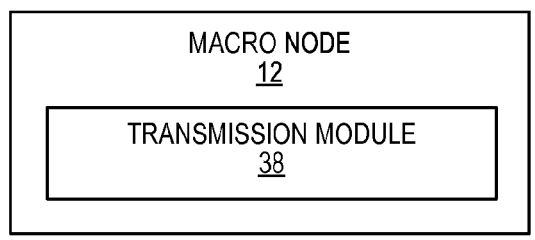
FIG. 15 is a block diagram of the macro node of FIG. 5 according to another embodiment of the present disclosure.

FIG. 15 illustrates the macro node 12 according to another embodiment of the present disclosure. In this embodiment, the macro node 12 includes a transmission module 38 that is implemented in software that, when executed by a processor (e.g., the processor 26 of FIG. 14) causes the macro node 12 to transmit a carrier that includes two or more physical signals (e.g., PSS/SSS and CRS) according to the embodiments above.

In one embodiment, a computer program including instructions which, when executed by at least one processor (e.g., the processor 26 of FIG. 14), cause the at least one processor to carry out the functionality of the macro node 12 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 28 of FIG. 14).

In the embodiment of FIG. 16, the LPN 16 includes a processor 40, a memory 42, a network interface 44, and a transceiver 46 coupled to one or more antennas 48. In particular embodiments, some or all of the functionality described above as being provided by the LPN 16 may be provided by the processor 40 executing instructions stored on a computer-readable medium (e.g., a non-transitory computer readable medium), such as the memory 42 illustrated in FIG. 16. Some embodiments of the LPN 16 may include additional components responsible for providing additional functionality, including any of the functionality identified above and/or any functionality necessary to support the solution described above.

FIG. 17 illustrates the LPN 16 according to another embodiment of the present disclosure. In this embodiment, the LPN 16 includes a transmission module 50 that is implemented in software that, when executed by a processor (e.g., the processor 40 of FIG. 16) causes the LPN 16 to transmit a carrier that includes two or more physical signals (e.g., PSS/SSS and CRS) according to the embodiments above.

In one embodiment, a computer program including instructions which, when executed by at least one processor (e.g., the processor 40 of FIG. 16), cause the at least one processor to carry out the functionality of the LPN 16 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 42 of FIG. 16).

Figure 18:
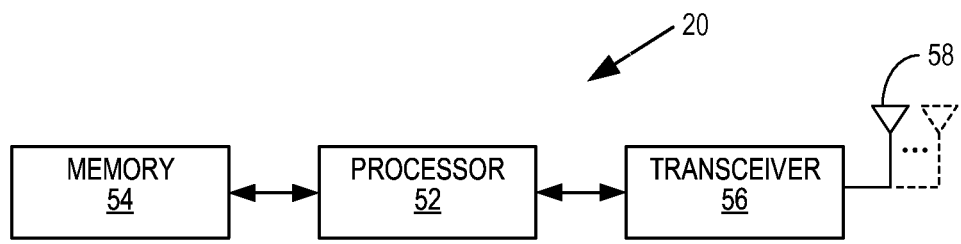
FIG. 18 is a block diagram of one of the wireless devices of FIG. 5 according to one embodiment of the present disclosure.
Figure 19:
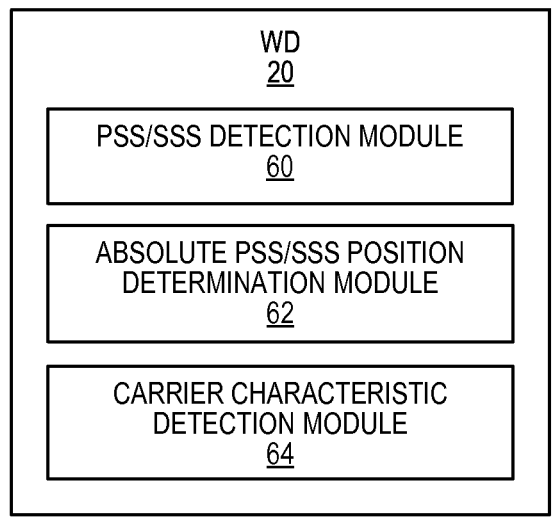
FIG. 19 is a block diagram of one of the wireless devices of FIG. 5 according to another embodiment of the present disclosure.

Although the wireless devices 20 may represent communication devices that include any suitable combination of hardware and/or software, the wireless devices 20 may, in particular embodiments, represent devices such as the example wireless device 20 illustrated in FIGS. 18 and 19. In the embodiment of FIG. 18, the wireless device 20 includes a processor 52, a memory 54, a transceiver 56, and one or more antennas 58. In particular embodiments, some or all of the functionality described above as being provided by the wireless device 20 may be provided by the processor 52 executing instructions stored on a computer-readable medium (e.g., a non-transitory computer readable medium), such as the memory 54 shown in FIG. 18. Some embodiments of the wireless device 20 may include additional components beyond those shown in FIG. 18 that may be responsible for providing certain aspects of the wireless device's 20 functionality, including any of the functionality described above and/or any functionality necessary to support the embodiments described above.

FIG. 19 illustrates another embodiment of the wireless device 20. As illustrated, in this embodiment, the wireless device 20 includes a PSS/SSS detection module 60, an absolute PSS/SSS position determination module 62, and a carrier characteristic detection module 64, each of which is implemented in software that when executed by a processor (e.g., the processor 52 of FIG. 18) causes of wireless device 20 to operate according to the embodiments described above. In general, the PSS/SSS detection module 60 is operative to detect PSS/SSS in a carrier transmitted by a radio access node (e.g., the macro node 12 or the LPN 16). The absolute PSS/SSS position determination module 62 is operative to determine the absolute position of the PSS/SSS detected by the PSS/SSS detection module 60. The carrier characteristic detection module 64 is operative to detect a characteristic of the carrier based on the absolute position of the PSS/SSS.

In one embodiment, a computer program including instructions which, when executed by at least one processor (e.g., the processor 52 of FIG. 18), cause the at least one processor to carry out the functionality of the wireless device 20 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 54 of FIG. 18).

Particular implementations of the proposed solutions provide methods, apparatuses, and/or systems for synchronization within a wireless communications system (e.g., the cellular communications network 10). In particular implementations, the proposed solutions provide a method for synchronization that includes monitoring a first carrier for received signals. The method also includes detecting a PSS and a SSS on the first carrier. The method also includes detecting a reference signal on the first carrier and determining a reference signal offset. The reference signal offset represents a spacing (e.g., a time-domain spacing) between the RS and one of the PSS and the SSS. Additionally, the method includes determining a carrier type or other carrier characteristic for the first carrier based on the reference signal offset. In particular implementations, the reference signal offset may specifically represent a spacing between a predetermined symbol within the RS and the PSS and/or the SSS.

In particular implementations, the method further includes determining a synchronization signal offset. The synchronization signal offset represents a spacing (e.g., a time-domain spacing) between the PSS and the SSS. The method additionally includes determining a duplexing mode for the first carrier based on the synchronization signal offset when the first carrier is of a first carrier type (e.g., legacy carrier) and determining the duplexing mode for the first carrier based on a position of at least one of the PSS and the SSS within a radio frame when the first carrier is of a second carrier type (e.g., new carrier). Depending on the implementation, the determination of carrier type for the first carrier may be made before the determination of duplexing mode for the first carrier frequency, or the determination of duplexing mode may be made before the determination of carrier type.

Furthermore, in particular implementations, detecting the PSS and the SSS involves searching for the PSS and the SSS using a first synchronization signal offset and, in response to not detecting the PSS and the SSS using the first synchronization signal offset, searching for the PSS and the SSS using a second synchronization signal offset. Additionally, in such implementations, determining the synchronization signal offset may be performed by determining which of the first synchronization signal offset and the second synchronization signal offset was used to successfully detect the PSS and/or the SSS.

Additionally, in particular implementations, the method may further involve performing RRM interference measurements for only a single RS location hypothesis. In particular implementations, this single RS location hypothesis may depend on the carrier type of the first frequency carrier.

Additionally, particular implementations of the proposed solutions provide methods, apparatuses, and/or systems for providing synchronization signals within a wireless communications system (e.g., the cellular communications network 10). In particular implementations, the proposed solutions provide a method for transmitting synchronization and reference signals on a carrier frequency (i.e., on a carrier signal). The method includes determining a carrier type for a first carrier. The method also includes transmitting a PSS, an SSS, and a RS on the first carrier. If the first carrier has a first carrier type (e.g., a new carrier type), the PSS, the SSS, and the RS are transmitted such that the RS has a first reference signal offset. The reference signal offset represents a spacing (e.g., a time-domain spacing) between the CRS and one of the PSS and the SSS. Additionally, in some embodiments, if the first carrier has the first carrier type, a position of the PSS and/or a position of the SSS within a radio frame is set based on a duplexing mode of the first carrier frequency. The method may further involve transmitting the PSS, the SSS, and the CRS with a synchronization signal offset determined based on a duplexing mode of the first carrier if the first carrier has a second carrier type (e.g., a legacy carrier type). The synchronization signal offset represents a spacing (e.g., a time-domain spacing) between the PSS and the SSS.

Additionally, particular embodiments of the proposed solutions may provide wireless communications devices capable of synchronizing with a wireless communications system and radio access nodes capable of providing synchronization and reference signals. These devices may include processors or other electronic circuitry configured to implement the above methods.

These example embodiments may be modified as described in the previous sections above and/or combined with any of the features described above.

The following acronyms are used throughout this disclosure.

3GPP Third Generation Partnership Project
ACK Acknowledgement
BCH Broadcast Channel
CRE Cell Range Expansion
CRS Common Reference Signal
CSI Channel State Information
CSO Cell Selection Offset
dB Decibel
DM-RS Demodulation Reference Signal
eNB Evolved Node B
ePBCH Enhanced Physical Broadcast Channel
ePDCCH Enhanced Physical Downlink Control Channel
ePHICH Enhanced Physical Hybrid Automatic Repeat Request Indicator Channel
eSS Enhanced Synchronization Symbol
FDD Frequency Division Duplexing
HARQ Hybrid Automatic Repeat Request
HeNB Home Evolved Node B
ID Identifier
LPN Low-Power Node
LTE Long Term Evolution
M2M Machine-to-Machine
MIB Master Information Block
ms Millisecond
MTC Machine Type Communication NACK Negative Acknowledgement
OFDM Orthogonal Frequency Division Multiplexing
PBCH Physical Broadcast Channel
PDCCH Physical Downlink Control Channel
PDSCH Physical Downlink Shared Channel
PHICH Physical Hybrid Automatic Repeat Request Indicator Channel
PRB Physical Resource Block
PSS Primary Synchronization Signal
RAN Radio Access Network
RB Resource Block
RE Resource Element
RFID Radio Frequency Identifier
RRM Radio Resource Management
RS Reference Symbol
RSRP Reference Signal Received Power
RSRQ Reference Signal Received Quality
SF Subframe
SIB System Information Block
SIR Signal-to-Interference Ratio
SSS Secondary Synchronization Signal
TDD Time Division Duplexing
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, comprising:
   receiving a carrier signal transmitted by a radio access node of the cellular communications network;
   detecting, in the carrier signal, a first physical signal that primarily supports synchronization and cell identification and a second physical signal that supports a functionality other than synchronization and cell identification, wherein a time-domain spacing between the first physical signal and the second physical signal is a function of a characteristic of the carrier signal; and
   determining the characteristic of the carrier signal based on the time-domain spacing between the first physical signal and the second physical signal detected in the carrier signal.

2. The method of claim 1 wherein the characteristic of the carrier signal is a carrier type of the carrier signal.

3. The method of claim 1 wherein the characteristic of the carrier signal is a carrier mode of operation of the carrier signal.

4. The method of claim 1 wherein:
   the first physical signal is a first synchronization signal selected from a group consisting of: a primary synchronization signal and a secondary synchronization signal; and
   the second physical signal is a reference signal.

5. The method of claim 4 further comprising:
   detecting a second synchronization signal, wherein the first synchronization signal is one of the primary synchronization signal and the secondary synchronization signal and the second synchronization signal is the other one of the primary synchronization signal and the secondary synchronization signal.

6. The method of claim 5 wherein:
   a time-domain spacing between the primary synchronization signal and the secondary synchronization signal is a function of the characteristic of the carrier signal; and
   determining the characteristic of the carrier signal comprises determining the characteristic of the carrier signal based on:
      the time-domain spacing between the primary synchronization signal and the secondary synchronization signal; and
      the time-domain spacing between the reference signal and the first synchronization signal.

7. The method of claim 5 wherein the reference signal is a cell-specific reference signal.

8. The method of claim 7 wherein the time-domain spacing is a time-domain spacing between a first symbol of the cell-specific reference signal in a subframe of the carrier signal and the first synchronization signal.

9. The method of claim 4 wherein the characteristic of the carrier signal is a carrier type of the carrier signal.

10. The method of claim 4 wherein the characteristic of the carrier signal is a carrier mode of operation of the carrier signal.

11. The method of claim 4 wherein detecting the first physical signal and the second physical signal comprises:
    searching for the reference signal using a predefined value for the time-domain spacing between the reference signal and the first synchronization signal for a corresponding cell of the cellular communications network.

12. The method of claim 5 wherein detecting the first physical signal and the second physical signal comprises:
    searching for the reference signal using a predefined value for the time-domain spacing between the reference signal and the first synchronization signal for a sequence used for at least one of the primary synchronization signal and the secondary synchronization signal.

13. The method of claim 4 wherein detecting the first physical signal and the second physical signal comprises:
    searching for the reference signal using one or more predefined values for the time-domain spacing between the reference signal and the first synchronization signal.

14. A wireless device for operation in a cellular communications network, comprising:
    a transceiver;
    a processor associated with the transceiver; and
    memory containing software instructions executable by the processor whereby the wireless device is operative to:
       receive, via the transceiver, a carrier signal transmitted by a radio access node of the cellular communications network;
       detect, in the carrier signal, a first physical signal that primarily supports synchronization and cell identification and a second physical signal that supports a functionality other than synchronization and cell identification, wherein a time-domain spacing between the first physical signal and the second physical signal is a function of a characteristic of the carrier signal; and
       determine the characteristic of the carrier signal based on the time-domain spacing between the first physical signal and the second physical signal detected in the carrier signal.

15. The wireless device of claim 14 wherein the characteristic of the carrier signal is a carrier type of the carrier signal.

16. The wireless device of claim 14 wherein the characteristic of the carrier signal is a carrier mode of operation of the carrier signal.

17. The wireless device of claim 14 wherein:
the first physical signal is a first synchronization signal selected from a group consisting of: a primary synchronization signal and a secondary synchronization signal; and
the second physical signal is a reference signal.

18. The wireless device of claim 17 wherein the software instructions, when executed by the processor, further cause the wireless device to:
detect a second synchronization signal, wherein the first synchronization signal is one of the primary synchronization signal and the secondary synchronization signal and the second synchronization signal is the other one of the primary synchronization signal and the secondary synchronization signal.

19. The wireless device of claim 18 wherein:
a time-domain spacing between the primary synchronization signal and the secondary synchronization signal is a function of the characteristic of the carrier signal; and
the software instructions, when executed by the processor, further cause the wireless device to determine the characteristic of the carrier signal based on:
the time-domain spacing between the primary synchronization signal and the secondary synchronization signal; and
the time-domain spacing between the first synchronization signal and the reference signal.

20. The wireless device of claim 17 wherein detecting the first physical signal and the second physical signal comprises:
searching for the reference signal using one of a group consisting of:
a predefined value for the time-domain spacing between the reference signal and the first synchronization signal for a corresponding cell of the cellular communications network;
a predefined value for the time-domain spacing between the reference signal and the first synchronization signal for a sequence used for at least one of the primary synchronization signal and the secondary synchronization signal; and
one or more predefined values for a time-domain spacing between the reference signal and the first synchronization signal.

21. A radio access node in a cellular communications network, comprising:
a transceiver;
a processor associated with the transceiver; and
memory containing software instructions executable by the processor whereby the radio access node is operative to transmit a carrier signal comprising a first physical signal that primarily supports synchronization and cell identification and a second physical signal that supports a functionality other than synchronization and cell identification such that a time-domain spacing between the first physical signal and the second physical signal is a function of a characteristic of the carrier signal.

22. The radio access node of claim 21 wherein the characteristic of the carrier signal is a carrier type of the carrier signal.

23. The radio access node of claim 21 wherein the characteristic of the carrier signal is a carrier mode of operation of the carrier signal.

24. The radio access node of claim 21 wherein:
the first physical signal is a first synchronization signal selected from a group consisting of: a primary synchronization signal and a secondary synchronization signal; and
the second physical signal is a reference signal.

25. The radio access node of claim 24 wherein the software instructions, when executed by the processor, further cause the radio access node to:
transmit a second synchronization signal, wherein the first synchronization signal is one of the primary synchronization signal and the secondary synchronization signal and the second synchronization signal is the other one of the primary synchronization signal and the secondary synchronization signal.

26. The radio access node of claim 25 wherein the software instructions, when executed by the processor, further cause the radio access node to:
transmit the carrier signal such that a time-domain spacing between the primary synchronization signal and the secondary synchronization signal is a function of the characteristic of the carrier signal.

27. The radio access node of claim 24 wherein the reference signal is a cell-specific reference signal.

28. The radio access node of claim 27 wherein the time-domain spacing is a time-domain spacing between a first symbol of the cell-specific reference signal in a subframe of the carrier signal and the first synchronization signal.

29. The radio access node of claim 24 wherein the characteristic of the carrier signal is a carrier type of the carrier signal.

30. The radio access node of claim 24 wherein the characteristic of the carrier signal is a carrier mode of operation of the carrier signal.

31. The radio access node of claim 24 wherein the time-domain spacing is also a function of at least one of a group consisting of:
a cell identifier of a corresponding cell of the cellular communications network;
a sequence used for the primary synchronization signal; and
a sequence used for the secondary synchronization signal.

* * * * *